United States Patent
Takano et al.

(10) Patent No.: US 8,933,586 B2
(45) Date of Patent: Jan. 13, 2015

(54) CHARGE CONTROL APPARATUS, TELEVISION RECEIVER, AND CHARGE CONTROL METHOD

(75) Inventors: Hiroyuki Takano, Osaka (JP); Atsushi Hanzawa, Osaka (JP); Kohichiroh Yamamoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/007,568

(22) PCT Filed: Apr. 2, 2012

(86) PCT No.: PCT/JP2012/058850
§ 371 (c)(1),
(2), (4) Date: Sep. 25, 2013

(87) PCT Pub. No.: WO2012/147455
PCT Pub. Date: Nov. 1, 2012

(65) Prior Publication Data
US 2014/0015320 A1    Jan. 16, 2014

(30) Foreign Application Priority Data

Apr. 27, 2011 (JP) .................................. 2011-100080
Mar. 6, 2012 (JP) .................................. 2012-049786

(51) Int. Cl.
*H02J 7/00* (2006.01)
*H01M 10/44* (2006.01)
*H02J 7/04* (2006.01)

(52) U.S. Cl.
CPC ............... *H02J 7/007* (2013.01); *H01M 10/44* (2013.01); *H02J 7/041* (2013.01); *H02J 7/044* (2013.01)

USPC .......................................................... 307/38

(58) Field of Classification Search
USPC .......................................................... 307/38
See application file for complete search history.

(56) References Cited

U.S. PATENT DOCUMENTS

| 6,483,272 B1 * | 11/2002 | Terada et al. .................. 320/103 |
| 8,310,094 B2 * | 11/2012 | Yamada et al. .................. 307/46 |
| 2009/0164152 A1 * | 6/2009 | Creus et al. ..................... 702/63 |

(Continued)

FOREIGN PATENT DOCUMENTS

| CN | 1960110 A | 5/2007 |
| JP | 2001-238358 A | 8/2001 |

(Continued)

OTHER PUBLICATIONS

International Search Report for PCT/JP2012/058850 dated May 1, 2012.

(Continued)

*Primary Examiner* — Rexford Barnie
*Assistant Examiner* — Daniel Kessie
(74) *Attorney, Agent, or Firm* — Birch, Stewart, Kolasch & Birch, LLP

(57) ABSTRACT

A monitor of a TV includes a control circuit which functions as a charge control section for controlling charging of a battery unit. The monitor has: a charge mode "mode 1" in which main charging of the battery unit with use of electric power supplied from the AC adapter is carried out in a case where the electric power is supplied from the AC adapter; and a charge mode "mode 2" in which the main charging of the battery unit with use of the electric power supplied from the AC adapter is not carried out even in the case where the electric power is supplied from the AC adapter.

7 Claims, 22 Drawing Sheets

(56) References Cited

U.S. PATENT DOCUMENTS

| | | |
|---|---|---|
| 2011/0202219 A1* | 8/2011 | Ishibashi .......................... 701/22 |
| 2011/0285343 A1* | 11/2011 | Weng ............................ 320/107 |
| 2011/0313613 A1* | 12/2011 | Kawahara et al. .............. 701/29 |

FOREIGN PATENT DOCUMENTS

| | | |
|---|---|---|
| JP | 2009-159749 A | 7/2009 |
| KR | 20100033661 A | 3/2010 |

OTHER PUBLICATIONS

Method for increasing the service life of the Battery of ThinkPad, SYJ0-0023B00, Lenovo Corporation, Mar. 31, 2010, URL:http://www-06.ibm.com/jp/domino04/pc/support.Sylphd03.nsf/print/SYJ0-0023B00.

Written Opinion of the International Searching Authority for PCT/JP2012/058850 dated May 1, 2012.

\* cited by examiner

FIG. 5

| CHARGE MODE | MAIN CHARGING |
|---|---|
| MODE 1 | YES |
| MODE 2 | NO |

FIG. 12

| POWER STATE TRANSITION OF MONITOR | POWER STATE TRANSITION OF STB |
|---|---|
| ON→STBY | ON→STBY |
| ON→OFF | ON→STBY |
| STBY→ON | STBY→ON |
| STBY→OFF | ON→STBY |
| OFF→ON | STBY→ON |

| REMAINING BATTERY LEVEL | ≤ 10% | ≤ 33% | ≤ 67% | ≤ 100% |
|---|---|---|---|---|
| REMAINING TIME FOR USING BATTERY | ≤ 14 min | ≤ 46 min | ≤ 94 min | ≤ 140 min |
| DURING BATTERY CHARGING | |  |  |  |
| DURING BATTERY DRIVING |  |  |  |  |

| CHARGE STATE | LIGHTING PATTERN |
|---|---|
| NO CHARGING | TURNED OFF |
| CHARGING | TURNED ON IN RED |
| TEMPERATURE ANOMALY | BLINKING IN RED (1Hz, DUTY RATIO 50%) |
| BATTERY ANOMALY | HIGH-SPEED BLINKING IN RED (3Hz, DUTY RATIO 50%) |

FIG. 18

| MODE | POWER SUPPLY FROM AC ADAPTER | |
|---|---|---|
| | YES | NO |
| MODE 1 | 350cd/m$^2$ | 200cd/m$^2$ |
| MODE 2 | 350cd/m$^2$ | 120cd/m$^2$ |
| MODE 3 | 350cd/m$^2$ | 350cd/m$^2$ |

CHARGE CONTROL APPARATUS, TELEVISION RECEIVER, AND CHARGE CONTROL METHOD

TECHNICAL FIELD

The present invention relates to a charge control apparatus, a television receiver, and a charge control method, each of which is capable of charging a secondary battery.

BACKGROUND ART

In recent years, there has been a growing demand for devices, such as home appliances, information devices, and communication devices, having easy portability. In response to such a demand, many of these devices realize easy portability by having a built-in battery (secondary battery) so that the devices can be used by being driven by the battery (battery driving) without connecting their power cords or power adapters to an AC outlet.

These devices have an issue of how to extend a battery-driven time and an issue of how to extend a battery life. In order to address the issues, a variety of techniques have been devised.

For example, Patent Literature 1 (see below) discloses a technique in which a secondary battery device having a remaining battery level monitoring section interrupts a switch circuit when a voltage of the secondary battery is low, thereby stopping supply of electric power to the remaining battery level monitoring section. According to the technique, since electric current consumed by the remaining battery level monitoring section becomes 0, it is possible to reduce internal power dissipation of the secondary battery device, and thus extend a battery-driven time.

CITATION LIST

Patent Literature

Patent Literature 1
Japanese Patent Application Publication, Tokukai, No. 2001-238358 A

SUMMARY OF INVENTION

Technical Problem

Secondary batteries tend to have a shorter life in a case where the second batteries are in a fully-charged state for a long time period. However, according to conventional techniques, even in a case where a device is used in a state where the device is connected to an AC outlet at all times with almost no battery driving carried out by a secondary battery, the device is always charged with electric power from an external power supply as long as the electric power is supplied from the external power supply. Further, since the battery driving is not carried out, the secondary battery discharges almost no electricity. These cause the secondary battery to be in the fully-charged state for a long time period. Accordingly, the conventional techniques cannot extend a life of secondary batteries.

The present invention has been made in view of the problem. An object of the present invention is to extend a life of a secondary battery by preventing occurrence of events that shorten the life of the secondary battery, such as continuation of a fully-charged state of the second battery for a long time period.

Solution to Problem

In order to attain the object, a charge control apparatus according to the present invention is a charge control apparatus for controlling charging of a secondary battery that is used in a device capable of being driven both with use of an external power supply and with use of the secondary battery, including: a first mode in which, in a case where electric power is supplied from the external power supply to the device, main charging of the secondary battery with use of the electric power supplied from the external power supply is carried out; and a second mode in which, even in the case where the electric power is supplied from the external power supply to the device, the main charging of the secondary battery with use of the electric power supplied from the external power supply is not carried out.

According to the charge control apparatus, by setting the mode of the charge control apparatus to the second mode, it is possible to prevent the secondary battery from continuing to be charged until the secondary battery reaches a fully-charged state, even in a case where electric power is supplied from the external power supply. This makes it possible to prevent such a situation where, even though the device has not been driven by the secondary battery for a long time period, the secondary battery continues to be charged so as to be in a fully-charged state, which is a cause of degradation, for a long time period. Therefore, a life of the secondary battery can be extended.

Note that the "main charging" denotes a way of charging in which charging of the secondary battery is continued until the secondary battery reaches a fully-charged state (a state in which the remaining battery level is 100% or approximately 100%). That is, the "main charging" denotes a way of charging in which the remaining battery level of the secondary battery is increased as high as possible in order to extend a time in which the device is driven by the secondary battery. Examples of a way of charging other than the "main charging" include "preliminary charging". The "preliminary charging" denotes a way of charging in which the remaining battery level of the secondary battery is reduced within a predetermined level by stopping charging of the secondary battery before the secondary battery reaches a fully-charged state. The second mode is simply required to be a mode in which at least the main charging is not carried out. The second mode may be a mode in which the secondary battery is not charged at all. Alternatively, the second mode may be a mode in which a way of charging other than the main charging, for example, preliminary charging of the secondary battery is carried out.

The television receiver according to the present invention includes the charge control apparatus.

According to the present invention, the television receiver provides an effect similar to that provided by the charge control apparatus.

A charge control method according to the present invention is a charge control method for controlling charging of a secondary battery that is used in a device capable of being driven both with use of an external power supply and with use of the secondary battery, the method including: a first mode in which, in a case where electric power is supplied from the external power supply to the device, main charging of the secondary battery with use of the electric power supplied from the external power supply is carried out; and a second mode in which, even in the case where the electric power is supplied from the external power supply to the device, the main charging of the secondary battery with use of the electric power supplied from the external power supply is not carried out.

According to the present invention, the charge control method is carried out by the charge control apparatus, so that an effect similar to that provided by the charge control apparatus can be provided.

Advantageous Effects of Invention

A charge control apparatus, a television receiver, and a charge control method according to the present invention has a first mode in which, in a case where electric power is supplied from the external power supply to the device, main charging of the secondary battery with use of the electric power supplied from the external power supply is carried out; and a second mode in which the main charging is not carried out. As such, by setting to the second mode while the device is not driven by the second battery, it is possible to prevent the secondary battery from continuing to be charged. This makes it possible to prevent occurrence of continuation of a fully-charged state of the secondary battery for a long time period, which is an event that shortens the life of the secondary batty. Therefore, the life of the secondary battery can be extended.

BRIEF DESCRIPTION OF DRAWINGS

FIG. 5 shows charge modes of a monitor according embodiment.

FIG. 12 is a view showing a relationship between transitions of a power state of a monitor according to an embodiment and transitions of a power state of an STB according to an embodiment.

FIG. 17 shows a correlation between a charge state of a battery and a lighting pattern of an indicator in a monitor according to an embodiment.

FIG. 18 shows settings for brightness of a display in a monitor according to an embodiment.

DESCRIPTION OF EMBODIMENTS

The following description discusses, with reference to drawings, an embodiment of the present invention.

(General Description of TV 100)

First, a general description of a television receiver system (hereinafter abbreviated to "TV") 100 is given.

Figure 1:
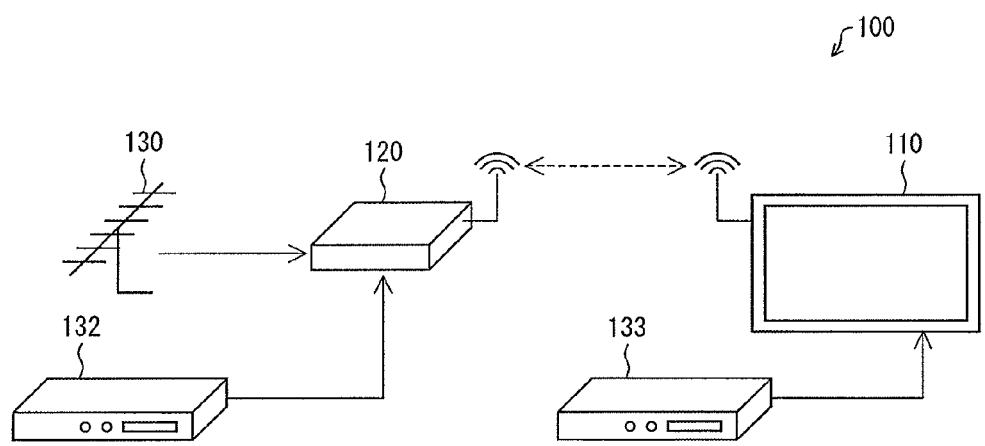
FIG. 1 is a view showing a device configuration of a TV according to an embodiment.

FIG. 1 is a view showing a device configuration of the TV 100 according to the embodiment. The TV 100 as shown in FIG. 1 is a so-called television receiver which is capable of receiving various types of content in a form of broadcast waves for digital television broadcasting or broadcast waves for digital satellite broadcasting (BS) via corresponding tuners (a digital TV tuner or a BS digital tuner) so as to reproduce the content. The TV 100 is constituted by a monitor 110 and an STB (set top box) 120.

The STB 120 includes a built-in tuner for receiving terrestrial digital broadcasting and satellite broadcasting (BS). The STB 120 obtains, with use of the tuner, content received via a DTV/BS antenna 130. Thereafter, the STB 120 encrypts, with use of DRM (Digital Rights Management) technique, the content thus obtained. The STB 120 then transmits the encrypted data to the monitor 110 by means of wireless communication. The monitor 110 encodes the encrypted data received from the STB 120. Then, the monitor 110 displays the content thus obtained on a display.

Means for communication between the STB 120 and the monitor 110 is preferably wireless communication, as adopted in the embodiment. This increases alternatives of a place in which the monitor 110 can be installed. This makes it possible to install the monitor 110 at any place within an area where wireless communication with the STB 120 is possible. A suitable transmission standard for the wireless communication between the STB 120 and the monitor 110 can be, for example, IEEE 802.11 series.

The STB 120 and the monitor 110 can have external devices connected thereto. For example, the STB 120 can have a recorder 132 connected thereto so that the STB 120 can record content on the recorder 132 or transmit the content to the monitor 110 by encrypting the content reproduced by the recorder 132. Similarly, the monitor 110 can have a recorder 133 connected thereto so that the monitor 110 can record content on the recorder 133 or display, on the display, the content reproduced by the recorder 133.

Note that a suitable transmission standard for (i) wire communication between the STB 120 and the external device and (ii) wire communication between the monitor 110 and the external device can be, for example, High Definition Multimedia Interface, HDMI (registered trademark).

In the present embodiment, a liquid crystal display is employed as the monitor 110. Note, however, that an organic EL display, a plasma display, or a cathode ray tube display can also be employed.

(Configuration of Monitor 110)

Figure 2:
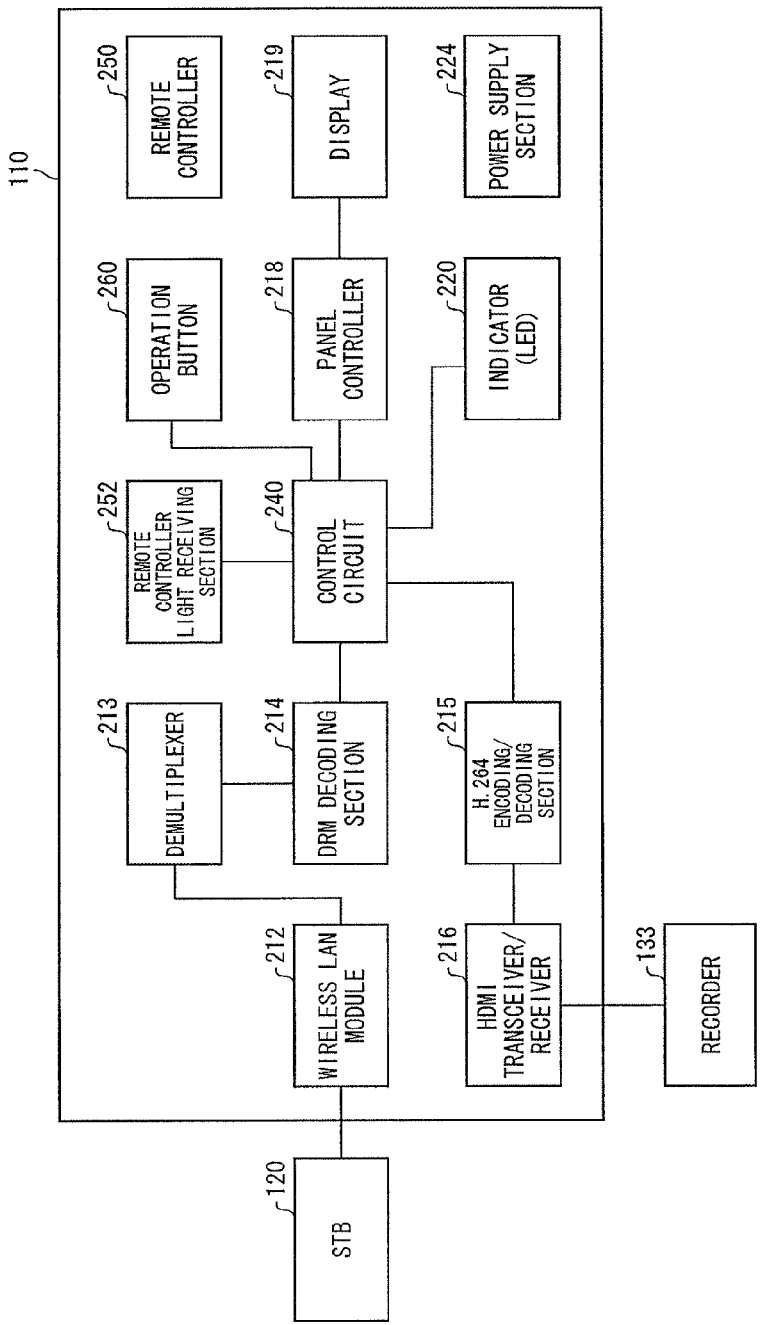
FIG. 2 is a block diagram showing a configuration of a monitor according to an embodiment.

The following description discusses a configuration of the monitor 110. FIG. 2 is a block diagram showing a configuration of the monitor 110 according to the embodiment.

As shown in FIG. 2, the monitor 110 is a device including a wireless LAN module 212, a demultiplexer 213, a DRM decoding section 214, a control circuit 240, a panel controller 218, a display 219, an H.264 encoding/decoding section 215, an HDMI transceiver/receiver 216, an indicator 220, and a power supply section 224.

The wireless LAN module 212 is a communication interface for wireless communication. The wireless LAN module 212 receives a signal from the STB 120 and supplies the signal to the demultiplexer 213. The demultiplexer 213 separates encrypted data from the signal. The encrypted data separated by the demultiplexer 213 is supplied to the DRM decoding section 214. The DRM decoding section 214 decodes the encrypted data so as to obtain an image signal. The image signal obtained by the DRM decoding section 214 is supplied to the control circuit 240.

The control circuit 240 is constituted by a CPU, a ROM, a RAM, and the like. The CPU executes programs recorded on the ROM, the RAM, and the like, so that sections of the monitor 110 are controlled. For example, the control circuit 240 superimposes an OSD (On-screen Display) display on an image formed from the image signal, and/or carries out an image quality correction (e.g., gamma curve control, contrast control, etc.). The image signal thus processed by the control circuit 240 is supplied to the panel controller 218.

The panel controller 218 drives, for example, a liquid crystal panel constituting the display 219, on the basis of the processed image signal.

In a case where content which is being reproduced on the monitor 110 is to be recorded on the recorder 133, the control circuit 240 also supplies the image signal obtained by the DRM decoding section 214 to the H.264 encoding/decoding section 215. The H.264 encoding/decoding section 215 encodes the image signal so as to obtain encoded data. The encoded data obtained by the H.264 encoding/decoding section 215 is supplied to the HDMI transceiver/receiver 216. The HDMI transceiver/receiver 216 transmits the encoded data to the recorder 133.

On the other hand, in a case where content which is being reproduced on the recorder 133 is to be displayed on the monitor 110, the HDMI transceiver/receiver 216 receives encoded data from the recorder 133. The H.264 encoding/decoding section 215 decodes the encoded data so as to obtain an image signal. The image signal obtained by the H.264 encoding/decoding section 215 is supplied to the panel controller 218 via the control circuit 240. The panel controller 218 drives, on the basis of the image signal, the liquid crystal panel that constitutes the display 219.

The power supply section 224 supplies, to the sections of the monitor 110, electric power that is necessary to operate each of the sections.

The indicator 220 is controlled by the control circuit 240 to be turned on, thereby notifying a user of a state and the like of the monitor 110.

The monitor 110 includes a remote controller 250 including a power button, and a remote controller light receiving section 252 for receiving infrared light emitted from the remote controller 250. Further, a main body of the monitor 110 is provided with operation buttons 260 including a power button. For example, by operating the remote controller 250 or the operation buttons 260, a user can carry out operations on the TV 100 such as turning on or off power, adjusting volume, selecting input sources, selecting channels, carrying out settings, recording, and reproducing.

Note that the control circuit 240 functions as a charge control section, a power state switching section, and a battery state notification section. Detail of each function is described later.

(Configuration of STB 120)

Figure 3:
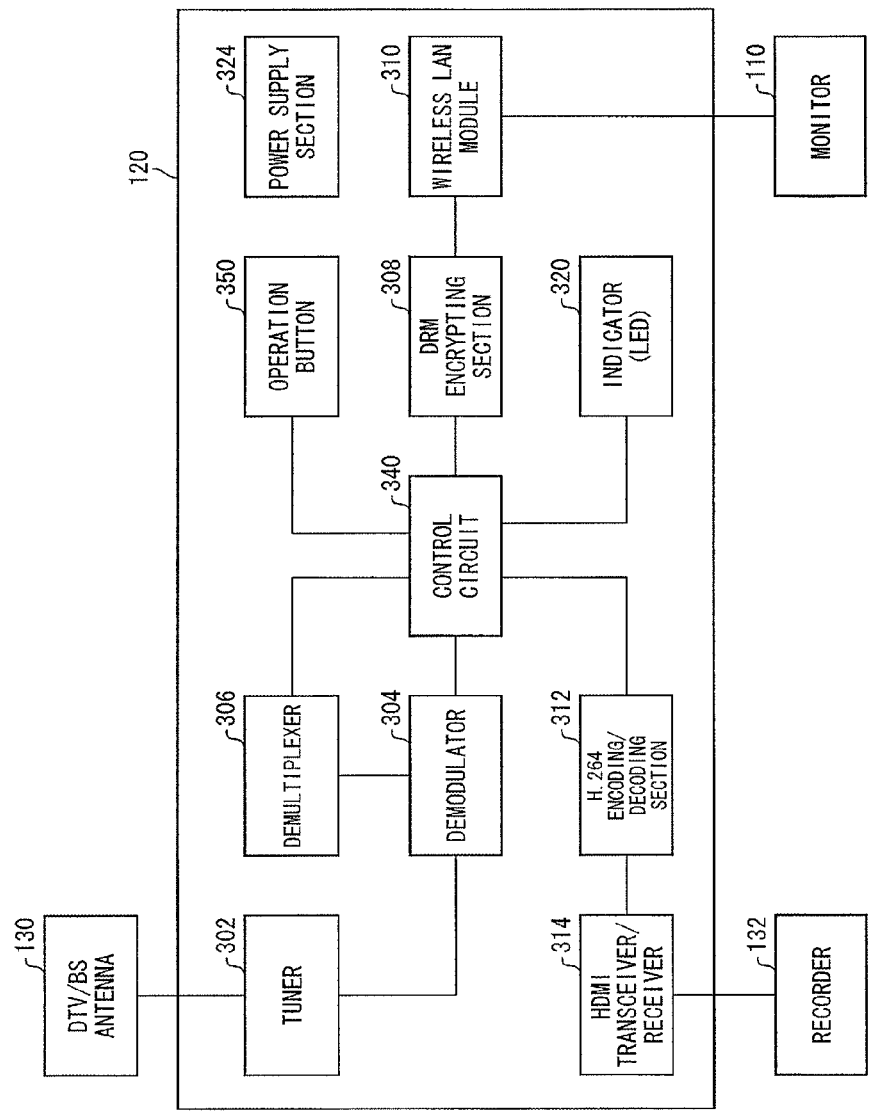
FIG. 3 is a block diagram showing a configuration of an STB according to an embodiment.

Next, the following description discusses a configuration of the STB 120. FIG. 3 is a block diagram showing a configuration of the STB 120 according to the embodiment.

As shown in FIG. 3, the STB 120 is a device including a tuner 302, a demodulator 304, a demultiplexer 306, a control circuit 340, a DRM encrypting section 308, a wireless LAN module 310, an H.264 encoding/decoding section 312, an HDMI transceiver/receiver 314, an indicator 320, and a power supply section 324.

The tuner 302 receives broadcast waves for digital television broadcasting or broadcast waves for digital satellite broadcasting (BS) from the DTV/BS antenna 130. Image data received by the tuner 302 is supplied to the demodulator 304.

The demodulator 304 demodulates image data. The image data demodulated by the demodulator 304 is supplied to the demultiplexer 306. The demultiplexer 306 separates an image signal from the image data. The image signal separated by the demultiplexer 306 is supplied to the control circuit 340.

The control circuit 340 is constituted by a CPU, a ROM, a RAM, and the like. The CPU executes programs recorded on the ROM, the RAM, and the like in order to control sections of the STB 120. For example, the control circuit 340 superimposes an OSD (On-screen Display) display on an image formed by the image signal, and/or carries out an image quality correction (e.g., gamma curve control, contrast control, etc.).

The image signal thus processed by the control circuit 340 is supplied to the DRM encrypting section 308. The DRM encrypting section 308 encrypts the image signal so as to obtain encrypted data. The encrypted data obtained by the DRM encrypting section 308 is supplied to the wireless LAN module 310. The wireless LAN module 310 is a communication interface for wireless communication. The wireless LAN module 310 transmits the encrypted data to the monitor 110.

In a case where content which is being reproduced at the STB 120 is to be recorded on the recorder 132, the control circuit 340 also supplies the image signal obtained by the demultiplexer 306 to the H.264 encoding/decoding section 312. The H.264 encoding/decoding section 312 encodes the image signal so as to obtain encoded data. The encoded data obtained by the H.264 encoding/decoding section 215 is supplied to the HDMI transceiver/receiver 314. The HDMI transceiver/receiver 314 transmits the encoded data to the recorder 132.

On the other hand, in a case where content which is being reproduced on the recorder 132 is to be displayed on the monitor 110, the HDMI transceiver/receiver 314 receives encoded data from the recorder 132. The H.264 encoding/decoding section 312 decodes the encoded data so as to obtain an image signal. The image signal obtained by the H.264 encoding/decoding section 312 is supplied to the DRM encrypting section 308 via the control circuit 340.

The DRM encrypting section 308 encrypts the image signal so as to obtain encrypted data. The encrypted data obtained by the DRM encrypting section 308 is supplied to the wireless LAN module 310. The wireless module 310 transmits the encrypted data to the monitor 110.

The power supply section 324 supplies, to the sections of the STB 120, electric power that is necessary to operate each of the sections.

The indicator 320 is controlled by the control circuit 340 to be turned on, thereby notifying a user of a state and the like of the STB 120.

A main body of the STB 120 is provided with operation buttons 350 including a power button. For example, by operating the operation buttons 350, a user can carry out operations on the STB 120 such as turning on or off power.

Note that the control circuit 340 functions as a power state switching section. Detail of the function is described later.

(Specific Configuration of Power Supply Section 224)

Figure 4:
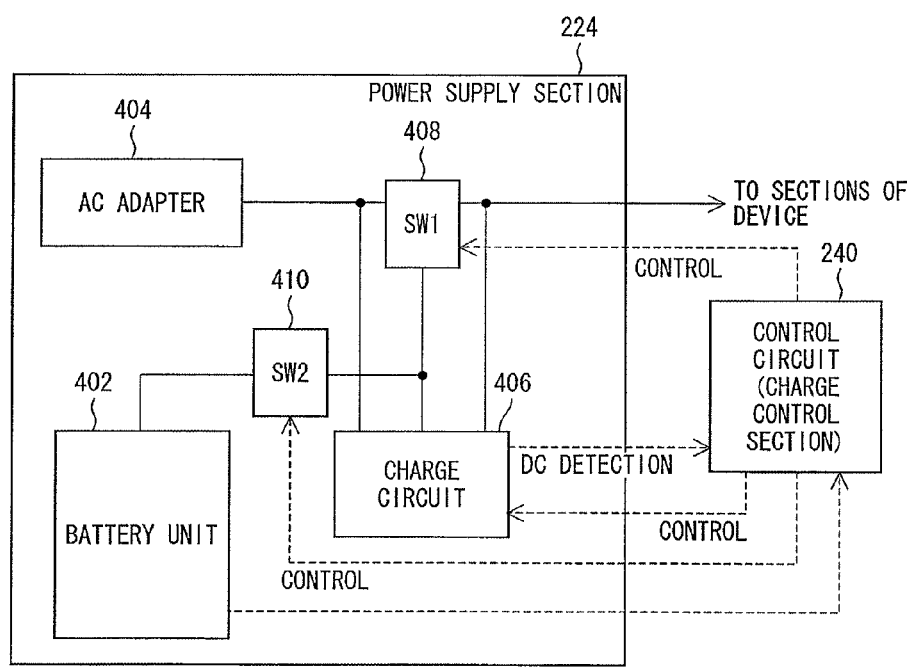
FIG. 4 is a block diagram showing a specific configuration of a power supply section according to an embodiment.

The following description discusses a specific configuration of the power supply section 224. FIG. 4 is a block diagram showing a specific configuration of the power supply section 224 according to the embodiment. As shown in FIG. 4, the power supply section 224 includes a battery unit 402, an AC adapter 404, a charge circuit 406, a switch 408, and a switch 410.

The AC adapter 404 is provided external to the main body of the monitor 110. The AC adapter is detachable from the main body of the monitor 110. On the other hand, the battery unit 402, the charge circuit 406, the switch 408, and the switch 410 are provided inside of the main body of the monitor 110.

In FIG. 4, connecting lines that are indicated in solid lines show supply paths through which electric power is supplied from a power supply (the AC adapter 404 or the battery unit 402). Connecting lines that are indicated in dotted arrows show transmission paths of various control signals.

The AC adapter 404 (external power supply) is connected to an AC outlet so as to supply electric power for driving the monitor 110 and charging the battery unit 402. The battery unit 402 (secondary battery) supplies electric power for driving the monitor 110.

The monitor 110 is operable by electric power supplied from the battery unit 402. Further, the monitor 110 is provided with a power input terminal to which the AC adapter 404 (external power supply) is connected. Accordingly, the monitor 110 is also operable by electric power supplied from the AC adapter 404 via the power input terminal.

Further, the monitor 110 functions as a charging device, by which the battery unit 402 can be charged with electric power supplied from the AC adapter 404.

The charge circuit 406 charges the battery unit 402 with use of electric power received from the AC adapter 404.

The switch 408 switches between (i) the supply path through which electric power is supplied from the AC adapter 404 and (ii) the supply path through which electric power is supplied from the battery unit 402. This causes a supply source of electric power for driving the monitor 110 to be switched between the AC adapter 404 and the battery unit 402.

The switch 410 is provided on the supply path through which electric power is supplied from the battery unit 402. The switch 410 is switched on or off so as to connect or disconnect the supply path.

The charge control section in the control circuit 240 controls charging of the battery unit 402 with electric power supplied from the AC adapter 404. Specifically, the charge control section controls the charge circuit 406, the switch 408, and the switch 410 so as to control the charging of the battery unit 402. Specific controls by the charge control section are described with reference to FIG. 5 and subsequent drawings.

(Setting of Charge Modes)

The monitor 110 has a plurality of charge modes. The charge control section controls a charging operation for the battery unit 402 to vary in accordance with the charge modes. FIG. 5 shows the charge modes of the monitor 110 according to the embodiment.

The monitor 110 of the present embodiment has a charge mode "mode 1" (a first mode) and a charge mode "mode 2" (a second mode). The "mode 1" is a mode in which, in a case where electric power is supplied from the AC adapter 404, the battery unit 402 is charged with use of the electric power. On the other hand, the "mode 2" is a mode in which, even in a case where electric power is supplied from the AC adapter 404, the battery unit 402 is not charged. In either of the modes, the monitor 110 can be driven by electric power supplied from the AC adapter 404, or can be in a state of stand-by instead of being driven by the electric power supplied from the AC adapter 404.

For example, in the "mode 1", the charge control section switches on a main charging function of the charge circuit 406 so as to cause the charge circuit 406 to carry out main charging of the battery unit 402 with use of electric power from the AC adapter 404. On the other hand, in the "mode 2", the charge control section switches off the main charging function of the charge circuit 406 so as not to cause the charge circuit 406 to carry out the main charging of the battery unit 402 with use of electric power from the AC adapter 404.

Note that a setting as to which one of the plurality of charge modes is enabled is stored, as setting information, in a recording medium such as a memory included in the monitor 110. For example, by operating the remote controller 250, a user can select any one of the "mode 1" and the "mode 2" so that the selected mode is enabled. The charge control section determines, by reading the setting information, in which charge mode the charge control section should operate.

(Notification of Messages)

As has been described, secondary batteries tend to have a shorter life in a case where the second batteries are in a fully-charged state for a long time period. Secondary batteries also tend to have a shorter life in a case where the second batteries are in a discharged state for a long time period.

In view of this, the charge control section displays, on the display 219, a screen showing a message that recommends a user not to charge the battery unit 402 (hereinafter referred to as a "non-charge recommendation screen"), in order to prevent the secondary battery from being in a fully-charged state for a long time period. That is, the charge control section functions as a first notification section.

The charge control section also displays, on the display 219, a screen showing a message that recommends a user to discharge the battery unit 402 (hereinafter referred to as a "discharge recommendation screen"). That is, the charge control section functions as a second notification section.

For example, in a case where a state in which (i) the monitor 110 is in the charge mode "mode 1" and (ii) the monitor 110 is driven by electric power from the AC adapter 404 continues for a predetermined time period, the charge control section displays the non-charge recommendation screen on the display 219.

That is, in a case where charging of the battery unit 402 is carried out even though no battery driving is carried out for a predetermined time period, the charge control section displays the non-charge recommendation screen on the display 219.

In the present embodiment, the predetermined time period is "30 days". However, this does not imply any limitation.

In a case where (i) the monitor 110 is in the charge mode "mode 2" for a predetermined time period and (ii) a remaining battery level (charged level) of the battery unit 402 exceeds a predetermined level, the charge control section displays the discharge recommendation screen on the display 219.

That is, in a case where the remaining battery level of the battery unit 402 exceeds a predetermined level even though no charging of the battery unit 402 is carried out for a predetermined time period, the charge control section displays the non-charge recommendation image on the display 219.

In the present embodiment, the predetermined time period is "14 days". However, this does not imply any limitation.

(Steps for Charge Control)

Figure 6:
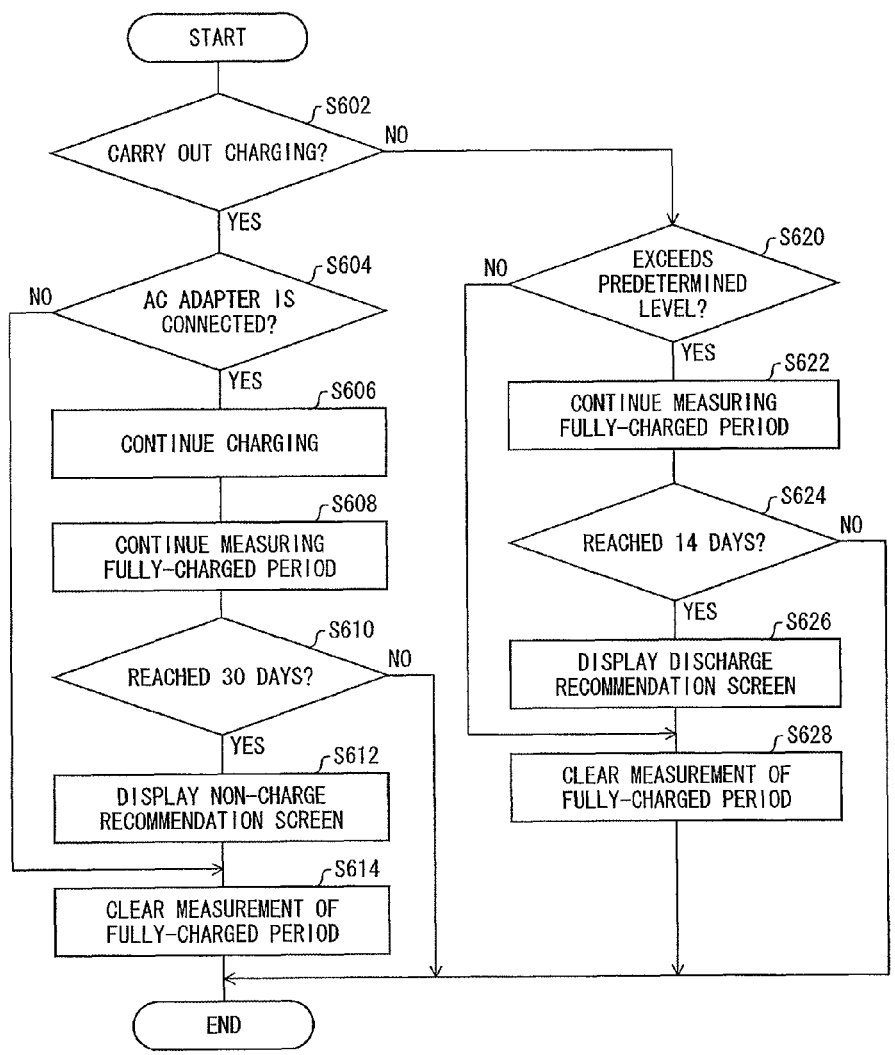
FIG. 6 is a flowchart showing successive steps for charge control carried out by a charge control section according to an embodiment.

The following description specifically discusses successive steps for charge control. FIG. 6 is a flowchart showing successive steps for charge control carried out by the charge control section according to the embodiment.

First, the charge control section reads a charge mode setting to thereby determine whether or not to carry out charging of the battery unit 402 (step S602). Specifically, in a case where the "mode 1" is set as a charge mode, the charge control section determines that charging of the battery unit 402 should be carried out. In a case where the "mode 2" is set as a charge mode, the charge control section determines that no charging of the battery unit 402 should be carried out.

In a case where the charge control section determines at step S602 that charging of the battery unit 402 should be carried out (step S602: Yes), the charge control section determines whether or not the AC adapter 404 is connected to the monitor 110 (step S604).

In a case where the charge control section determines at step S604 that the AC adapter is not connected to the monitor 110 (step S604: No), the charge control section clears a measurement, measured by a timer function, of a period during which the battery unit 402 is fully charged (hereinafter referred to as a "fully-charged period") (step S614), and ceases the charge control.

On the other hand, in a case where the charge control section determines at step S604 that the AC adapter 404 is connected to the monitor 110 (step S604: Yes), the charge control section continues to (i) charge the battery unit 402 with use of electric power supplied from the AC adapter 404 (step S606) and (ii) measure the fully-charged period by the timer function (step S608).

In a case where charging has not been started yet at step S606, a process carried out at step S606 will be "to start charging the battery unit 402". In a case where measurement has not been started yet at step S608, a process carried out at step S608 will be "to start measuring the fully-charged period by the timer function".

Subsequently, the charge control section determines whether or not the fully-charged period which has been measured by the timer function has reached 30 days (step S610).

Figure 7:
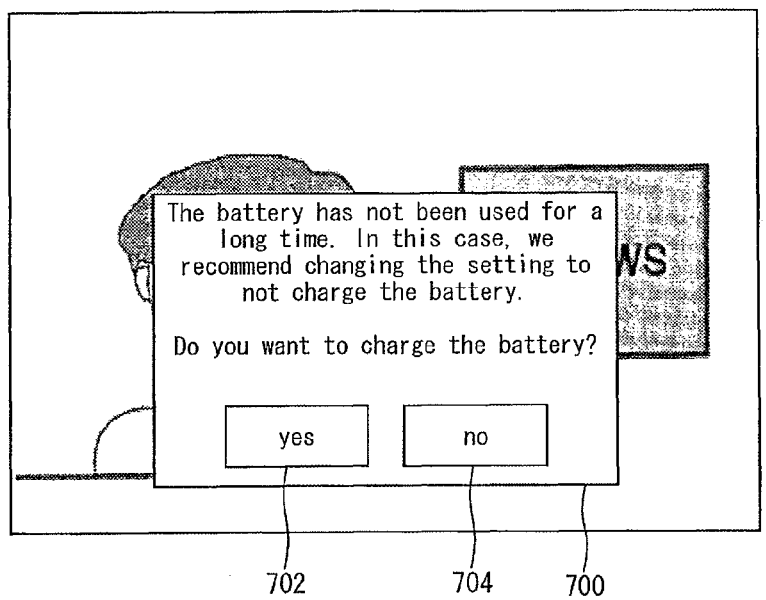
FIG. 7 is an example of a non-charge recommendation screen displayed by a monitor according to an embodiment.

In a case where the charge control section determines at step S610 that the fully-charged period has reached 30 days (step S610: Yes), the charge control section displays, on the display 219, the non-charge recommendation screen as shown in FIG. 7 (step S612). Then, the charge control section clears a measurement of the fully-charged period measured by the timer function (step S614) and ceases the charge control.

On the other hand, in a case where the charge control section determines at step S610 that the fully-charged period has not reached 30 days (step S610: No), the charge control section ceases the charge control.

In a case where the charge control section determines not to charge the battery unit 402 at step S602 (step S602: No), the charge control section determines whether or not the remaining battery level of the battery unit 402 exceeds a predetermined level (step S620).

In a case where the charge control section determines at step S620 that the remaining battery level does not exceed the predetermined level (step S620: No), the charge control section clears a measurement of the fully-charged period measured by the timer function (step S628), and ceases the charge control.

On the other hand, in a case where the charge control section determines at step S620 that the remaining battery level exceeds the predetermined level (step S620: Yes), the charge control section continues to measure the fully-charged period by the timer function (step S622). Then, the charge control section determines whether or not the fully-charged period which has been measured by the timer function has reached 14 days (step S624).

Figure 8:
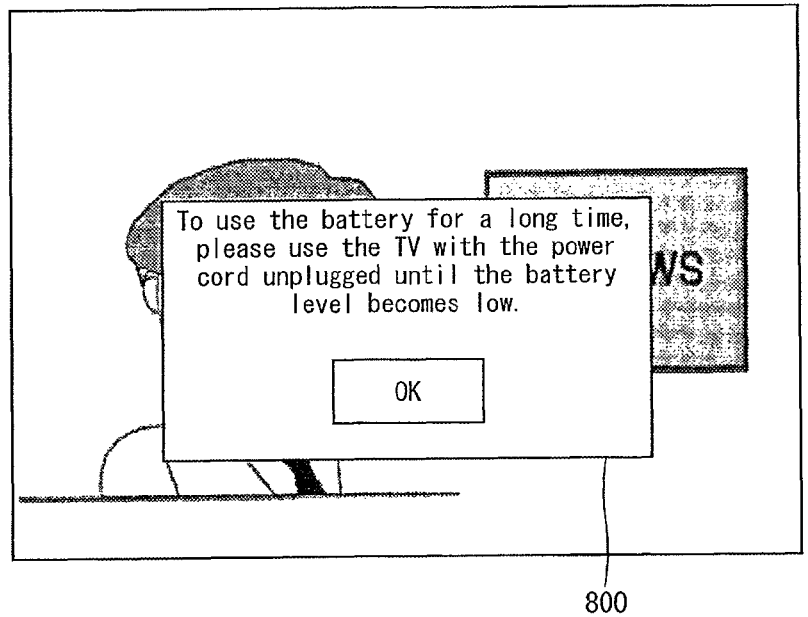
FIG. 8 is an example of a discharge recommendation screen displayed by a monitor according to an embodiment.

In a case where the charge control section determines at step S624 that the fully-charged period has reached 14 days (step S624: Yes), the charge control section displays, on the display 219, the discharge recommendation screen as shown in FIG. 8 (step S626). Then, the charge control section clears a measurement of the fully-charged period measured by the timer function (step S628) and ceases the charge control.

On the other hand, in a case where the charge control section determines at step S624 that the fully-charged period has not reached 14 days (step S624: No), the charge control section ceases the charge control.

The charge control section repeatedly carries out the charge control. This makes it possible to urge a user, in a timely manner, not to fully charge the battery unit 402 or to discharge the battery unit 402.

Note that the charge control section can be configured to either repeat the control or carry out the control in a predetermined timing. The predetermined timing can be, for example, a timing at which a power state is switched from "ON" to "OFF" or "STBY (stand-by)", or a timing at which a power state is switched from "OFF" or "STBY (stand-by)" to "ON".

(Example of Non-charge Recommendation Screen)

FIG. 7 shows an example of the non-charge recommendation screen displayed by the monitor 110 according to the embodiment. A screen 700 shown in FIG. 7 is a non-charge recommendation screen. The screen 700 shows a message that recommends a user not to charge the battery unit 402. The monitor 110 displays the screen 700 on the display 219 when charging of the battery unit 402 continues for a predetermined time period.

According to the example shown in FIG. 7, the screen 700 contains a button 702 and a button 704 for selecting whether or not to charge the battery unit 402. When the button 702 is selected, the monitor 110 maintains the charge mode "mode 1" so that main charging of the battery unit 402 is continued. On the other hand, when the button 704 is selected, the monitor 110 switches the charge mode to "mode 2" so that the main charging of the battery unit 402 is not carried out thereafter.

(Example of Discharge Recommendation Screen)

FIG. 8 shows an example of the discharge recommendation screen displayed by the monitor 110 according to the embodiment. A screen 800 shown in FIG. 8 is a discharge recommendation screen. The screen 800 shows a message that recommends a user to discharge the battery unit 402. The monitor 110 displays the screen 800 on the display 219 when the remaining battery level of the battery unit 402 exceeds a predetermined level for a predetermined time period.

A user who has acknowledged the message shown in the screen 800 can, by following the message, detach the AC adapter 404 from the monitor 110 or from the AC outlet, and switch the monitor 110 to battery driving. This makes it possible to discharge the battery unit 402.

(Effect)

As described above, in a case where charging of the battery unit 402 continues for a predetermined time period, the monitor 110 of the present embodiment notifies a user of a message not to charge the battery unit 402. Further, in a case where the remaining battery level of the battery unit 402 exceeds a predetermined level for a predetermined time period, the monitor 110 of the present embodiment notifies a user of a message to discharge the battery unit 402.

In response to the messages, a user can change a setting of the monitor 110 so as not to charge the battery unit 402, or cause the monitor 110 to operate so as to discharge the battery unit 402, thereby preventing the battery unit 402 from being in a fully-charged state continuously for a long time period. Accordingly, a life of the battery unit 402 can be extended.

(Preliminary Charging)

Next, the following description discusses a preliminary charging function of the monitor 110. Preliminary charging is carried out in order to prevent the battery unit 402 from discharging excessively. The preliminary charging of the battery unit 402 is controlled by the charge control section.

Specifically, in a case where the remaining battery level of the battery unit 402 is within a predetermined range, the monitor 110 carries out the preliminary charging of the battery unit 402 in order to prevent a further decrease of the remaining battery level. In particular, the monitor 110 starts the preliminary charging in a case where the remaining battery level of the battery unit 402 has decreased to the lowest level of the predetermined range. That is, even in a case where the remaining battery level of the battery unit 402 is within the predetermined range, the preliminary charging is not started unless the remaining battery level has decreased to the lowest level.

In the present embodiment, the lowest level of the predetermined range is set at "0%", and the highest level of the predetermined range is set at "8%". In this description, the "0%" corresponds to a discharge cut-off voltage, not an output voltage of a battery unit being 0 V. As for the highest level, it can be set as high as possible within a level that does not change an indication of a remaining battery level icon (see FIG. 13) so that the preliminary charging can be carried out without a user's awareness.

Further, in the present embodiment, the monitor 110 is configured to carry out the preliminary charging only when its power state is "ON".

(Steps for Preliminary Charging Control)

Figure 9:
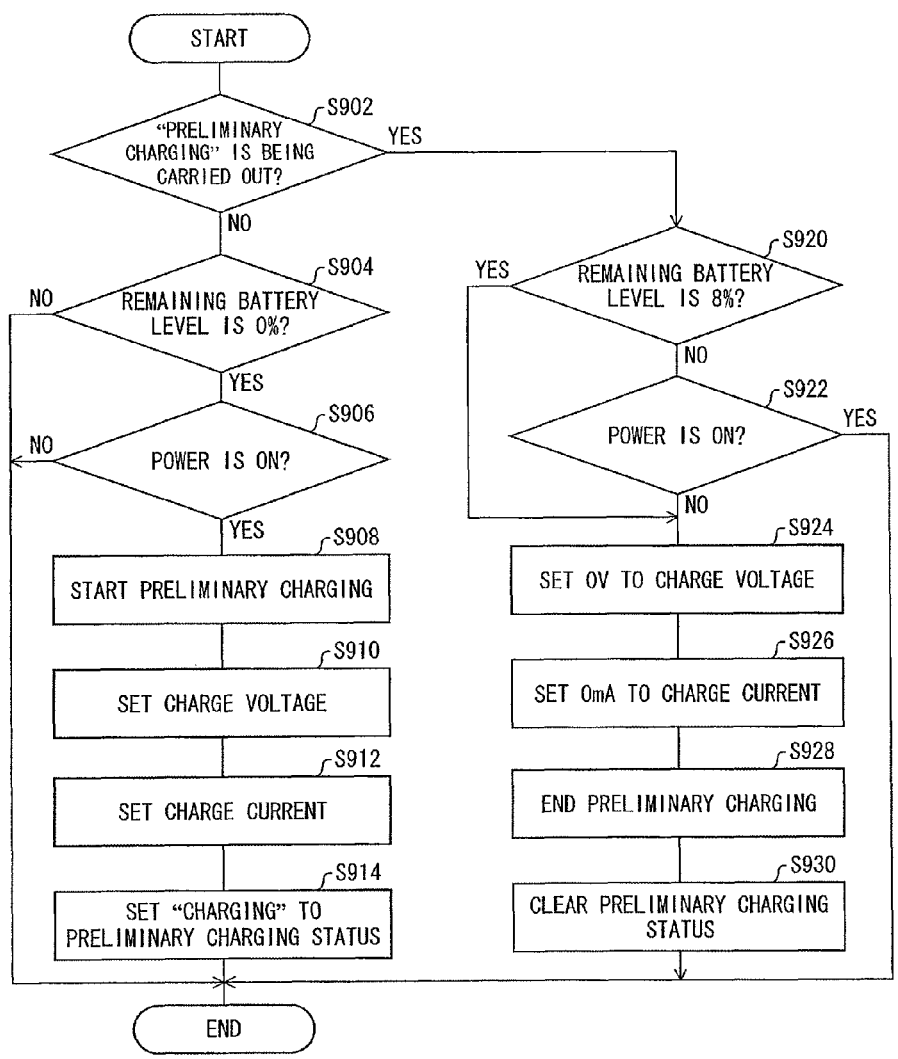
FIG. 9 is a flowchart showing successive steps for preliminary charging control carried out by a charge control section according to an embodiment.

The following description specifically discusses successive steps for preliminary charging control. FIG. 9 is a flowchart showing successive steps for preliminary charging control carried out by the charge control section.

First, the charge control section determines whether or not a preliminary charging status, indicating whether or not preliminary charging is being carried out, indicates "charging" (step S902).

In a case where the charge control section determines at step S902 that the preliminary charging status does not indicate "charging" (step S902: No), the charge control section determines whether or not the remaining battery level of the battery unit 402 is 0% (step S904).

In a case where the charge control section determines at step S904 that the remaining battery level is not 0% (step S904: No), the charge control section ceases the preliminary charging control.

On the other hand, in a case where the charge control section determines at step S904 that the remaining battery level is 0% (step S904: Yes), the charge control section determines whether or not power of the monitor 110 has been turned on (step S906).

In a case where the charge control section determines at step S906 that the power of the monitor 110 has not been turned on (step S906: No), the charge control section ceases the preliminary charging control.

On the other hand, in a case where the charge control section determines at step S906 that the power of the monitor 110 has been turned on (step S906: Yes), the charge control section starts preliminary charging of the battery unit 402 (step S908). Then, the charge control section sets a charge voltage and a charge current (steps S910 and S912, respectively) for carrying out the preliminary charging of the battery unit 402, causes the preliminary charging status to indicate "charging" (step S914), and ceases the preliminary charging control.

In a case where the charge control section determines at step S906 that the preliminary charging status indicates "charging" (step S902: Yes), the charge control section then determines whether or not the remaining battery level of the battery unit 402 is not less than 8% (step S920).

In a case where the charge control section determines at step S920 that the remaining battery level is not less than 8% (step S920: Yes), the charge control section proceeds to step S924.

On the other hand, in a case where the remaining battery level is not less than 8% at the step S920 (step S920: No), the charge control section determines whether or not the power of the monitor 110 has been turned on (step S922).

In a case where the charge control section determines at step S922 that the power of the monitor 110 has been turned on (step S922: Yes), the charge control section ceases the preliminary charging control.

On the other hand, in a case where the charge control section determines at step S922 that the power of the monitor 110 has not been turned on (step S922: No), the charge control section proceeds to step S924.

At step S924, the charge control section sets a charge voltage at 0 V in order to cease the preliminary charging of the battery unit 402 (step S924). In addition to this, the charge control section sets a charge current at 0 mA in order to cease the preliminary charging of the battery unit 402 (step S926). Then, the charge control section ceases the preliminary charging of the battery unit 402.

(Example of Preliminary Charging Operation)

Figure 10:
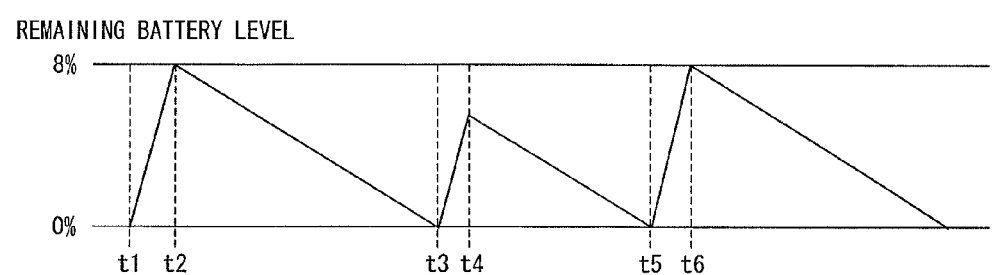
FIG. 10 shows an example of a preliminary charging operation carried out by a monitor according to an embodiment.

Next, the following description discusses an example of a preliminary charging operation carried out by the monitor 110. FIG. 10 shows an example of a preliminary charging operation carried out by the monitor 110 according to the embodiment. As shown in FIG. 10, the monitor 110 of the present embodiment carries out preliminary charging of the battery unit 402 so that the remaining battery level of the battery unit 402 is maintained between 0% (the lowest level) and 8% (the highest level).

For example, as shown by timings t1, t3, and t5 in FIG. 10, the monitor 110 starts the preliminary charging of the battery unit 402 when the remaining battery level of the battery unit 402 is reduced to 0% by self discharge.

Further, as shown by timings t2 and t6 in FIG. 10, the monitor 110 ceases the preliminary charging of the battery unit 402 when the remaining battery level of the battery unit 402 is increased to 8% by the preliminary charging.

As described earlier, in the present embodiment, the monitor 110 carries out preliminary charging only when a power state of the monitor 110 is "ON". Accordingly, as shown by a timing t4 in FIG. 10, the monitor 110 ceases the preliminary charging of the battery unit 402 when the power state of the monitor 110 is switched to "OFF" or "STBY (stand-by)" even though the remaining battery level of the battery unit 402 has not reached 8%.

Note that the monitor 110 has a table showing a correlation between an output voltage (V) and a remaining battery level (mAh) of the battery unit 402. The monitor 110 estimates, by referring to the table, the remaining battery level of the battery unit 402 from the output voltage of the battery unit 402.

A method for obtaining the remaining battery level of the battery unit 402 is not limited to the above. For example, in a case where the battery unit 402 has a function to measure its own remaining battery level, the monitor 110 can send an inquiry, to the battery unit 402, about the remaining battery level of the battery unit 402 so as to obtain the remaining battery level of the battery unit 402.

(Effect)

As described above, in a case where the remaining battery level of the battery unit 402 is within a predetermined range, the monitor 110 according to the present embodiment carries out preliminary charging of the battery unit 402 for preventing a further decrease of the remaining battery level.

This makes it possible to maintain the remaining battery level of the battery unit 402 so that the battery unit 402 is not fully discharged. This makes it possible to prevent such a situation where, in a case where the battery unit 402 has not been charged for a long time period, the battery unit 402 falls into a fully-discharged state which is a cause of degradation of the battery unit 402. Therefore, the life of the battery unit 402 can be extended.

In particular, in a case where the remaining battery level of the battery unit 402 is reduced to the lowest level of the predetermined range, the monitor 110 of the present embodiment starts preliminary charging of the battery unit 402.

This makes it possible to reduce the number of times that the preliminary charging is carried out. Accordingly, it becomes possible to further extend the life of the battery unit 402.

(Additional Functions of TV 100)

Next, the following description discusses additional functions of the monitor 110. As has been described, the control circuit 240 included in the monitor 110 functions not only as the charge control section, but also as the power state switching section and the battery state notification section. Further, the control circuit 230 included in the STB 120 functions as a power state switching section. The following description specifically discusses these functions. First, how the monitor 110 functions as the power state switching section and how the STB 120 functions as the power state switching section are described.

(Power State Switching Section of Monitor 110)

The power state switching section of the monitor 110 switches the power state of the monitor 110. Specifically, the power state switching section of the monitor 110 switches the power state of the monitor 110 in response to an operation by a user pressing the power button included in either of the remote controller 250 or the main body of the monitor 110.

(Power State Switching Section of STB 120)

The power state switching section of the STB 120 switches a power state of the STB 120. Specifically, the power state switching section of the STB 120 switches the power state of the STB 120 in response to an operation by a user pressing the power button included in the main body of the STB 120.

The power state switching section of the STB 120 can also switch the power state of the STB 120 in synchronization with switching of the power state of the monitor 110. Specifically, upon switching the power state of the monitor 110, the power state switching section of the monitor 110 transmits a control signal to the STB 120 via wireless communication. The power state switching section of the STB 120, upon receipt of the control signal, switches the power state of the STB 120 in accordance with content of the control signal (that is, to which state the power state of the monitor 110 was switched).

(Power States of Monitor 110)

The following description discusses power states that can be realized by the monitor 110 and the STB 120. The monitor 110 has the following power states: "ON", "OFF" and "STBY (stand-by)". In the "ON" power state, the display 219 is driven, so that it is possible to view content. In the "OFF" power state and the "STBY (stand-by) power state, driving of the display 219 is stopped, so that it is not possible to view content.

The difference between the "OFF" power state and the "STBY (stand-by)" power sate is as follows. In the "STBY (stand-by) power state", the monitor 110 accepts power-switching operations via both the power button included in the remote controller 250 and the power button included in the main body of the monitor 110. On the other hand, in the "OFF" power state, the monitor 110 does not accept power-switching operations via the power button included in the remote controller 250, and accepts only power-switching operations via the power button included in the main body of the monitor 110.

In a case where (i) scheduled viewing for a TV program has been set and (ii) the power state of the monitor 110 is "STBY (stand-by)", the power state is automatically turned to "ON" at a start time of the scheduled viewing, so that it is possible to view the TV program. On the other hand, in a case where (i) scheduled viewing for a TV program has been set and (ii) the power state of the monitor 110 is "OFF", the power state is not automatically turned to "ON" at the start time of the scheduled viewing.

The power states of the monitor 110 are indicated by the indicator 220 (LED light). For example, when the power state of the monitor 110 is "ON", the indicator 220 is turned on in green. In a case where (i) scheduled viewing has been set and (ii) the power state of the monitor 110 is "STBY (stand-by)", the indicator 220 is turned on in orange. In a case where (i) scheduled viewing has not been set and (ii) the power state of the monitor 110 is "STBY (stand-by)", the indicator 220 is turned on in red. For example, in a case where the power state of the monitor 110 is "OFF", the indicator 220 is not turned on.

(Power States of STB 120)

The STB 120 has the following power states "ON", "OFF", and "STBY (stand-by)". In the "ON" power state, the STB 120 can carry out a series of operations for viewing content, such as receiving broadcast waves and transmitting image signals. In the "OFF" power state and the "STBY (stand-by)" power state, the STB 120 cannot carry out the series of operations.

The difference between the "OFF" power state and the "STBY (stand-by)" power state is as follows. In the "STBY (stand-by)" power state, the STB 120 accepts (i) a power-switching operation carried out in synchronization with the monitor 110 and (ii) a power-switching operation carried out via the power button included in the main body of the STB 120. On the other hand, in the "OFF" power state, the STB 120 does not accept the power-switching operation carried out in synchronization with the monitor 110, and accepts only the power-switching operation carried out via the power button included in the main body of the STB 120.

Further, in a case where (i) scheduled recording for a TV program and the like has been set and (ii) the power state of the STB 120 is "STBY (stand-by)", the STB 120 starts background recording of the TV program and the like without switching the power state of the STB 120. On the other hand, in a case where (i) scheduled recording for a TV program and the like has been set and (ii) the power state of the STB 120 is "OFF", the STB 120 does not start recording the TV program and the like at the start time of the scheduled recording.

The power states of the STB 120 are indicated by the indicator 320 (LED light) included in the main body of the STB 120. For example, in a case where the power state of the STB 120 is "ON", the indicator 320 is turned on in green. In a case where (i) scheduled recording has been set and (ii) the power state of the STB 120 is "STBY (stand-by)", the indicator 320 is turned on in orange. In a case where (i) scheduled recording has not been set and (ii) the power state of the STB 120 is "STBY (stand-by)", the indicator 320 is turned on in red. For example, in a case where the power state of the STB 120 is "OFF", the indicator 320 is not turned on.

(Transition of Power State of Monitor 110)

Figure 11:
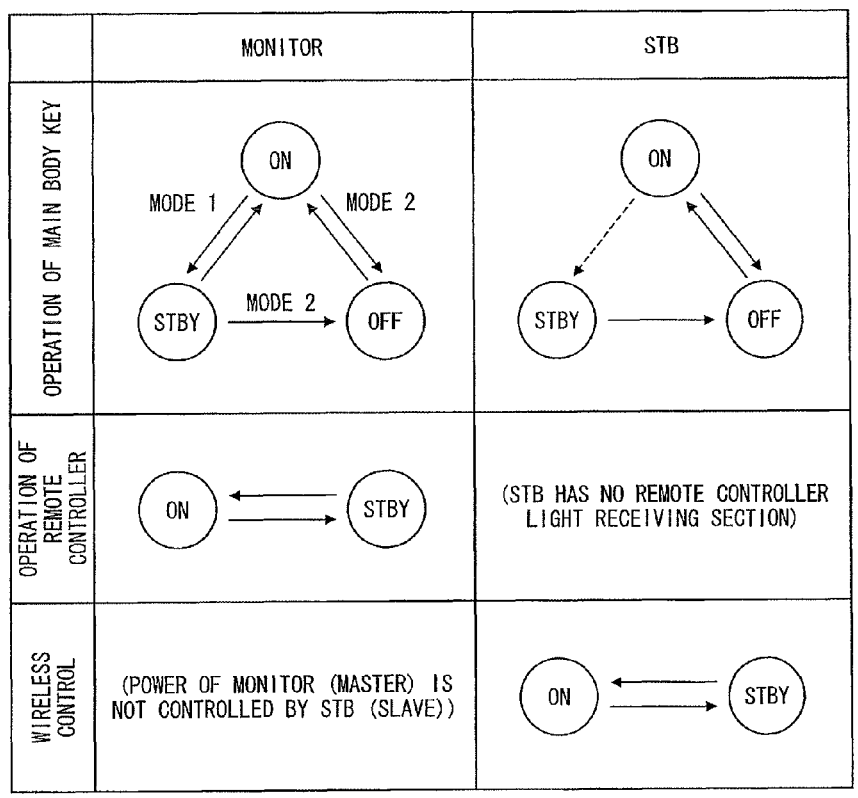
FIG. 11 is a view showing a transition of a power state of a monitor according to an embodiment and a power state of an STB according to the embodiment.

FIG. 11 is a view showing a transition of the power state of the monitor 110 according to the embodiment and a transition of the power state of the STB 120 according to the embodiment.

As shown in FIG. 11, when the power state switching section of the monitor 110 switches the power state of the monitor 110, the power state switching section carries out different switching operations depending on the power state of the monitor 110 at the time of switching the power state of the monitor 110.

Further, when the power state switching section of the monitor 110 switches the power state of the monitor 110, the power state switching section carries out different switching operations in a case where the power button included in the remote controller 250 is pressed by a user and in a case where the power button of the main body of the monitor 110 is pressed by a user.

For example, in a case where a user pressed the power button of the main body of the monitor 110, the power state switching section of the monitor 110 switches the power state of the monitor 110 to "ON", "OFF", or "STBY (stand-by)".

On the other hand, in a case where a user pressed the power button included in the remote controller 250, the power state switching section of the monitor 110 switches the power state of the monitor 110 to "ON" or "STBY (stand-by)".

That is, it is not possible to switch the power state of the monitor 110 to "OFF" by an operation via the remote controller 205.

Further, when the power state switching section of the monitor 110 switches the power state of the monitor 110, the power state switching section of the monitor 110 also carries out different switching operations depending on a setting of a power switch mode at the time of switching the power state of the monitor 110.

(Power Switch Mode)

In the present embodiment, the monitor 110 has a power switch mode, which can be set to "mode 1" or "mode 2". The "mode 1" is a mode in which it is prohibited to switch the power state of the monitor 110 to "OFF" by pressing the power button of the main part of the monitor 110. The "mode 2" is a mode in which it is allowed to switch the power state of the monitor 110 to "OFF" by pressing the power button of the main part of the monitor 110.

For example, in a case where (i) the power state of the monitor 110 is "ON" and (ii) the "mode 1 has been set, the power state switching section of the monitor 110 switches the power state to "STBY (stand-by)" when the power button of the main part is pressed.

On the other hand, in a case where (i) the power state of the monitor 110 is "ON" and (ii) the "mode 2" has been set, the power state switching section of the monitor 110 switches the power state to "OFF" when the power button of the main part is pressed.

Further, in a case where the power state of the monitor 110 is "STBY (stand-by)" and (ii) the "mode 1" has been set, the power state switching section of the monitor 110 switches the power state to "ON" when the power button of the main part is pressed.

On the other hand, in a case where (i) the power state of the monitor 110 is "STBY (stand-by)" and (ii) the "mode 2" has been set, the power state switching section of the monitor 110 switches the power state to "OFF" when the power button of the main part is pressed.

These settings for the power switch mode are stored as setting information in a recording medium such as a memory included in the monitor 110. The setting information can also be set to any mode defined by a user.

(Transition of Power State of STB 120)

Similarly, as shown in FIG. 11, when the power state switching section of the STB 120 switches the power state of the STB 120, the power state switching section carries out different switching operations depending on the power state of the STB 120 at the time of switching the power state of the STB 120.

Further, when the power state switching section of the STB 120 switches the power state of the STB 120, the power state switching section carries out different switching operations in a case where the power button included in the main body is pressed by a user and in a case where the STB 120 receives a control signal from the monitor 110.

For example, in a case where a user pressed the power button of the main body of the STB 120, the power state switching section of the STB 120 switches the power state of the STB 120 to "ON" or "OFF".

On the other hand, in a case where the STB 120 received a control signal from the monitor 110, the power state switching section of the STB 120 switches the power state of the STB 120 to "ON" or "STBY (stand-by)".

That is, in a case where switching of the power state of the STB 120 is carried out in synchronization with switching of the power state of the monitor 110, the power state of the STB 120 is not switched to "OFF".

(Synchronization of Power States)

As has been described, the STB 120 can switch its power state in synchronization with the power state of the monitor 110. The following description discusses, with reference to FIG. 12, how the switching is specifically carried out.

FIG. 12 is a view showing a relationship between transitions of the power state of the monitor 110 according to the embodiment, and transitions of the power state of the STB 120 according to the embodiment.

As shown in FIG. 12, a transition of the power state of the STB 120 is determined in accordance with a corresponding transitional pattern of the power state of the monitor 110. The power state of the STB 120 is switched in accordance with a setting, thus determined, of the transition of the power state of the STB 120. As can also be seen in FIG. 12, the power state of the STB 120 is switched to "ON" or "STBY (stand-by), but is not switched to "OFF", in a case where the power state of the STB 120 is switched in synchronization with the monitor 110.

Note here that, in order to cause a transition of the power state of the STB 120 as shown in FIG. 12, the power state of the STB 120 needs to be a pre-transitional state as shown in FIG. 12. In a case where the power state of the STB 120 is not in the pre-transitional state, the transition of the power state of the STB 120 does not occur.

For example, FIG. 12 indicates that, in a case where the power state of the monitor 110 is switched from "ON" to "STBY (stand-by)", the power state of the STB 120 is switched from "ON" to "STBY (stand-by)", in synchronization with the switching of the power state of the monitor 110.

However, in a case where the power state of the STB 120 is already "STBY (stand-by)" or "OFF", the STB 120 does not carry out a power switching operation.

(Operation at the Time of Communication Abnormality)

The STB 120 regularly carries out wireless communication with the monitor 110 in order to check whether communication between the STB 120 and the monitor 110 is properly carried out. For example, the STB 120 carries out the wireless communication every three seconds. The power state switching section of the STB 120 monitors the wireless communication. Upon detecting an abnormality in the wireless communication, the power state switching section of the STB 120 switches the power state of the STB 120 to "STBY (stand-by)".

After the power state of the STB 120 is switched to "STBY (stand-by)", the STB 120 retries the wireless communication with the monitor 110. In a case where the monitor 110 normally receives the wireless communication retried, the monitor 110 transmits, to the STB 120, a control signal for switching the power state of the STB 120 to "ON". When the STB 120 receives the control signal, the power state switching section of the STB 120 switches the power state of the STB 120 to "ON".

Note that, during pairing, the STB 120 does not carry out the above-described operation which is carried out at the time of a communication abnormality. The "pairing" in this description denotes an operation for linking devices so that the devices can recognize each other as a communication partner. For example, when the TV 100 is shipped as a product, the monitor 110 and the STB 120 are not linked with each other. Pairing the monitor 110 and the STB 120 causes the monitor 110 and the STB 120 to be linked with each other as communication partners, and thus allows the monitor 110 and the STB 120 to communicate with each other.

(Battery State Notification Section)

Next, the following description discusses how the monitor 110 functions as the battery state notification section. The battery state notification section of the monitor 110 notifies a user of a charge state and a remaining battery level of the battery unit 402. The following description specifically discusses an example of how notifications of the charge state and the remaining battery level of the battery unit 402 are made under control of the battery state notification section of the monitor 110.

(Display of Battery State Icon)

Figure 13:
FIG. 13 shows an example of a battery state icon displayed by a monitor according to an embodiment.
Figure 13:
Figure 13:
Figure 13:
Figure 13:
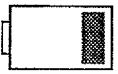
Figure 13:
Figure 13:

The monitor 110 displays, on the display 219, an icon (hereinafter referred to as "battery state icon") indicative of a charge state and a remaining battery level of the battery unit 402. FIG. 13 shows examples of the battery state icon displayed by the monitor 110 according to the embodiment.

As shown in FIG. 13, the monitor 110 displays the battery state icon which illustrates the charge state and the remaining battery level of the battery unit 402 so that a user can understand the charge state and the remaining battery level.

Figure 14:
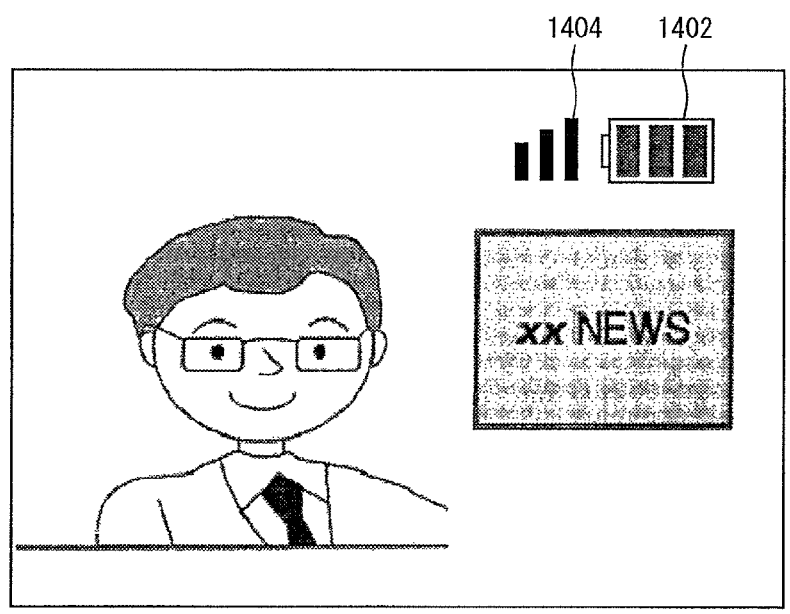
FIG. 14 shows an example of how a battery state icon is displayed by a monitor according to an embodiment.

FIG. 14 shows an example of how the battery state icon is displayed by the monitor 110 according to the embodiment. In the example shown in FIG. 14, an icon 1402 and an icon 1404 are displayed side by side in an upper right portion of a screen of the display 219. The icon 1402 is the battery state icon. The icon 1404 is an icon indicative of a received signal strength in wireless communication.

The monitor 110 may display the battery state icon on the display 219 at all times. Alternatively, the monitor 110 may switch between displaying/not displaying the battery state icon on the basis of a certain setting or condition.

For example, the monitor 110 may cause a user to make a setting in advance as to whether or not to display the battery state icon, and switch between displaying/not displaying the battery state icon on the basis of the setting. The monitor 110 may also switch between displaying/not displaying the battery state icon depending on a type of a screen displayed on the display 219.

Note that, the monitor 110 does not display the battery state icon in a case where the battery unit 402 is neither being charged or used.

(Display of Remaining Battery Level Message)

In a case where the remaining battery level of the battery unit 402 falls below a predetermined level, the monitor 110 displays, on the display 219, a screen (hereinafter referred to as "remaining battery level warning screen") showing a predetermined message which notifies a user that the remaining batter level has fallen below the predetermined level. Note that the monitor 110 is set up for a plurality of predetermined levels in stages. The monitor 110 displays a predetermined remaining battery level warning screen on the display 219 every time the remaining battery level of the battery unit 402 falls below any of the predetermined levels. In this example, the monitor 110 is set up for 5%, 3%, and 1% in stages as the predetermined levels. That is, the monitor 110 displays a predetermined remaining battery level warning screen on the display 219 every time the remaining battery level of the battery unit 402 falls below 5%, 3%, or 1%.

Figure 15:
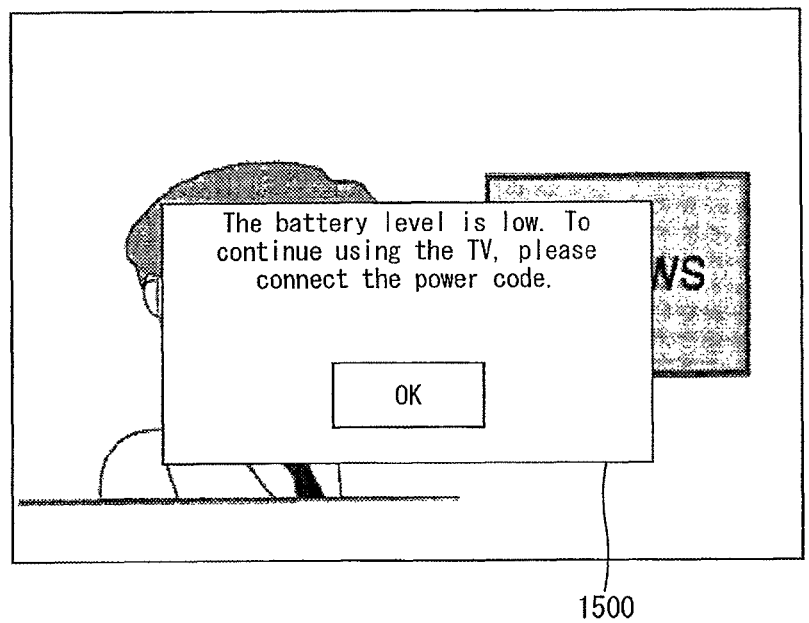
FIG. 15 shows an example of a remaining battery level warning screen displayed by a monitor according to an embodiment.
Figure 16:
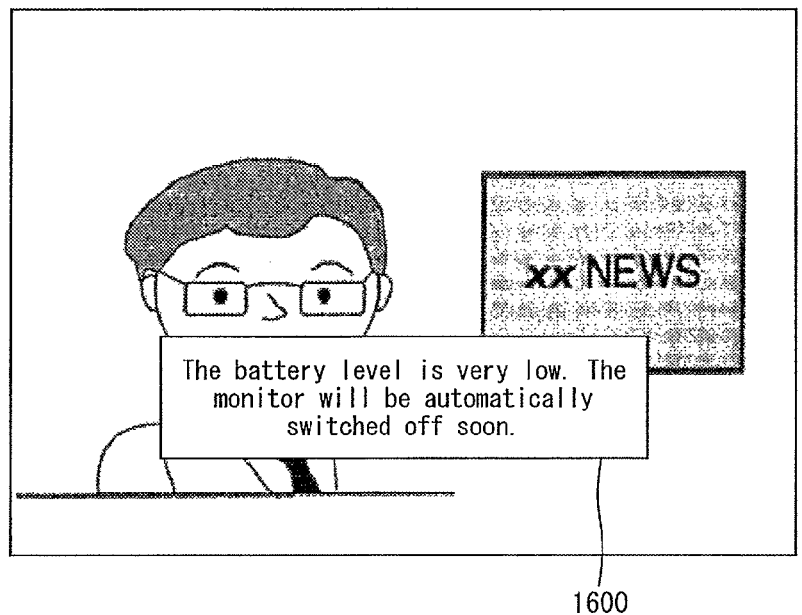
FIG. 16 shows an example of a remaining battery level warning screen displayed by a monitor according to an embodiment.

FIGS. 15 and 16 show examples of the remaining battery level warning screen displayed by the monitor 110 according to the embodiment. Among the examples, a screen 1500 shown in FIG. 15 is a remaining battery level warning screen which is displayed in a case where the remaining battery level of the battery unit 402 falls below 5% or 3%. The screen 1500 shows a message which notifies a user that the remaining battery level of the battery unit 402 is low and therefore a power cord should be connected to the monitor 110.

In a case where (i) the monitor 110 is battery-driven and (ii) the remaining battery level of the battery unit 402 has fallen below 5%, the monitor 110 displays, on the display 219, the remaining battery level warning screen as shown in FIG. 15.

Subsequently, in a case where the remaining battery level of the battery unit 402 further decreases so as to fall below 3%, the monitor 110 further displays, on the display 219, the remaining battery level warning screen as shown in FIG. 15.

Note that the remaining battery level warning screen as shown in FIG. 15 is similarly displayed by the monitor 110 on the display 219, also in a case where the remaining battery level of the battery unit 402 has fallen below 5% when the power of the monitor 110 is turned on.

Each time after displaying any of the remaining battery level warning screens as described above, the monitor 110 finishes displaying the remaining battery level warning screen in any of the following cases (1) through (4). (1) A case in which a predetermined time has passed. Note that the predetermined time adopted in the monitor 110 is 15 seconds, but is not limited to this. (2) A case in which a user carries out a predetermined operation that indicates that the user has acknowledged the message (e.g., a case in which the "OK" button shown in FIG. 15 is pressed). (3) A case in which, while the remaining battery level warning screen is displayed, the remaining battery level of the battery unit 402 further decreases, so that the next remaining battery level warning screen is displayed. (4) A case in which supply of electric power from the external power supply is started.

On the other hand, a screen 1600 shown in FIG. 16 is a remaining battery level warning screen which is displayed in a case where the remaining battery level of the battery unit 402 falls below 1%. The screen 1600 shows a message which notifies a user that the remaining battery level of the battery unit 402 is low and therefore the monitor 110 will be automatically turned off.

More specifically, in a case where (i) the monitor 110 is battery-driven and (ii) the remaining battery level of the battery unit 402 falls below 1%, the monitor 110 displays, on the display 219, the remaining battery level warning screen as shown in FIG. 16.

After displaying the remaining battery level warning screen as described above, the monitor 110 finishes displaying the remaining battery level warning screen in any of the following cases (5) and (6). (5) A case in which a predetermined time has passed. Note that the predetermined time employed in the monitor 110 is 15 seconds, but is not limited to this. (6) A case in which supply of electric power from the external power supply is started.

(Automatic Power-Off Function)

The monitor 110 has a function of automatically turning off the power of the monitor 110 in a case where the remaining battery level of the battery unit 402 becomes low. In the present embodiment, the power of the monitor 110 is automatically turned off in a case where a predetermined time has passed, without the start of supply of electric power from the external power supply, since the remaining battery level of the battery unit 402 fell below 1% and the message as shown in FIG. 16 was displayed.

At this time, the power state of the monitor 110 undergoes transitions similar to those in the case where the power button of the main body of the monitor 110 is pressed while the monitor 110 is in the "ON" power state, as shown in FIG. 11. That is, in a case where the "mode 1" has been set, the power state is switched to "STBY (stand-by)". In a case where the "mode 2" has been set, the power state is switched to "OFF".

(Power-on Prohibiting Function)

The monitor 110 also has a function of not turning on the power of the monitor 110 in response to pressing of the power button, in a case where the remaining battery level of the battery unit 402 is not higher than a predetermined level. In the present embodiment, the monitor 110 does not turn on the power of the monitor 110 in response to pressing of the power button, in a case where the remaining battery level of the battery unit 402 falls below 2%.

Specifically, in a case where the power button is pressed while the monitor 110 is in the "OFF" power state, the monitor 110 maintains the "OFF" power state.

In a case where the power button is pressed while the monitor 110 is in the "STBY (stand-by)" power state, the monitor 110 maintains the "STBY (stand-by)" power state. Note, however, that in a case where (i) the "mode 2" has been set as the power switch mode and (ii) the power button included in the main body of the monitor 110 is pressed, the monitor 110 switches from the "STBY (stand-by)" power state to the "OFF" power state.

(Notification of Battery Charge State)

The monitor 110 causes the indicator 220 (LED light) to be turned on in a pattern in accordance with a charge state of the battery unit 402 so that a user can understand the charge state of the battery unit 402. The indicator 220 is provided on an outer surface of the main body 102 of the monitor 110.

FIG. 17 shows a correlation between a charge state of the battery unit 402 and a lighting pattern of indicator 220 in the monitor 110 according to the embodiment. As shown in FIG. 17, the monitor 110 causes the indicator 220 to be turned on in accordance with a charge state of the battery unit 402 so that a user can understand the charge state of the battery unit 402.

In particular, the monitor 110 makes the lighting pattern of the indicator 220 different so that a user can understand whether or not the battery unit 402 is being charged. In this example, the monitor 110 turns on or off the indicator 220 so that a user can understand whether or not the battery unit 402 is being charged.

In a case where any unusual event occurs during charging, the monitor 110 causes the lighting pattern of the indicator 220 to vary so as to allow a user to understand what the unusual event is. In this example, the monitor 110 causes a cycle of blinking of the indicator 220 to vary in a case of a temperature anomaly and in a case of a battery anomaly, so that a user can understand what the unusual event is.

The term "temperature anomaly" in this description denotes an anomaly caused in the temperature of the battery unit 402. For example, the monitor 110 carries out communication with the battery unit 402, and, upon reception of a signal indicative of a temperature anomaly from the battery unit 402, determines that the battery unit 402 has a temperature anomaly.

The term "battery anomaly" in this description denotes an anomaly of the battery unit 402 itself, or an anomaly caused in communication with the battery unit 402. For example, in such cases where the monitor 110 receives a signal indicative of any unusual event from the battery unit 402 via communication with the battery unit 402, or where the monitor 110 cannot receive any signal from the battery unit 402, the monitor 110 determines that the battery unit 402 has an anomaly.

Note that FIG. 17 shows lighting states of the indicator 220 in a case where electric power is supplied from the adapter. In a case where no electric power is supplied from the adapter, the indicator 220 is not turned on.

(Luminance Settings of Light at the Time of Battery Driving)

The monitor 110 has a plurality of modes related to brightness of a light (backlight) of the display 219. The monitor 110 is capable of causing the brightness of the light of the display 219, at the time of battery driving, to vary in accordance with a setting of each mode.

FIG. 18 shows settings for the brightness of the display 219 of the monitor 110 according to the embodiment. As shown in FIG. 18, the monitor 110 of the present embodiment has a "mode 1", a "mode 2", and a "mode 3" as preset modes for the brightness of the light of display 219. For each of the modes, the monitor 110 has a preset value of brightness of the light of the display 219.

The "mode 1" is a mode in which the brightness of the display 219 is suppressed. The "mode 2" is a mode in which the brightness of the light of the display 219 is suppressed to a greater extent. The "mode 3" is a mode in which the brightness of the light of the display 219 is maximized. These mode settings are stored as setting information in a recording medium such as a memory included in the monitor 110.

For example, a user can select and enable any of the "mode 1", "mode 2", and "mode 3" by operating the remote controller 250. The monitor 110 determines, by reading this setting information, which charge mode to operate in.

According to the brightness settings shown in FIG. 18, all of the modes have a preset brightness of "350 cd/m$^2$" in a case where electric power is supplied from the external power supply. In a case where no electric power is supplied from the external power supply (that is, in a case where battery driving is carried out), a preset brightness varies from mode to mode. These brightness settings are stored as setting information in a recording medium such as a memory included in the monitor 110.

For example, in a case where (i) the "mode 1" has been set and (ii) the monitor 110 is switched to battery driving, the monitor 110 changes the brightness of the light to "200 cd/m$^2$". In a case where (i) the "mode 2" has been set and (ii) the monitor 110 is switched to battery driving, the monitor 110 changes the brightness of the light to "120 cd/m$^2$". In a case where (i) the "mode 3" has been set and (ii) the monitor 110 is switched to battery driving, the monitor 110 changes the brightness of the light to "350 cd/m$^2$".

(Brightness Adjustment)

Note that each of the above-described brightnesses indicates a maximum brightness that can be achieved in a corresponding one of the modes. In all of the modes, a user can adjust the brightness of the light in a plurality of stages and within the respective above-described brightnesses which serve as maximum values.

For example, in all of the modes, a user can adjust the brightness of the light between −16 and +16. "−16" is a value at which the light is the darkest. "+16" is a value at which the light is the brightest (that is, a value at which the light has a brightness shown in FIG. 18).

Note that, although a maximum brightness varies from mode to mode, the number of adjustment stages, in which the adjustment is made, does not vary. That is, an amount of change in brightness caused between the adjustment stages varies from mode to mode.

(Battery-Off Mode)

The monitor 110 has a battery-off mode in addition to the functions described above. The battery-off mode is a mode for interrupting supply of electric power from the battery unit 402. According to the battery-off mode, supply of electric power from the battery unit 402 is interrupted even in a case where the remaining battery level of the battery unit 402 is sufficiently high. Accordingly, even in a case where the power button is pressed in a state where the AC adapter 404 is not connected, the power of the monitor 110 is not turned on. For example, the monitor 110 can be in the battery-off mode so as to prevent the power of the monitor 110 from being accidentally turned on before shipment of the monitor 110 as a product.

The battery-off mode is controlled by the control circuit 240 to be enabled or disabled. For example, before shipment of the monitor 110 as a product, the control circuit 240 supplies a low signal to the switch 410, which is provided on the supply path through which electric power is supplied from the battery unit 402. This causes the switch 410 to be switched off. Further, before shipment, the control circuit 240 switches the switch 408 to be connected to an AC adapter 404 side. This causes the monitor 110 to be in the battery-off mode before shipment. At this time, supply of electric power from the AC adapter 404 and supply of electric power from the battery unit 402 are both stopped, so that the control circuit 240 is in a reset state.

After shipment, when use of the monitor 110 is started, the battery-off mode is automatically canceled. For example, when the AC adapter 404 is connected to the monitor 110, electric power is supplied from the AC adapter 404 to the sections of the monitor 110, since the switch 408 is connected to the AC adapter 404 side. This causes the control circuit 240 to start operating. Upon start of operation, the control circuit 240 switches on the switch 410 by carrying sending a high signal to the switch 410. This allows the monitor 110 to be driven by electric power supplied from the battery unit 402.

Thereafter, the control circuit 240 (i) switches the switch 408 to be connected to the AC adapter 404 side when the AC adapter 404 is connected to the monitor 110 and (ii) switches the switch 408 to be connected to a battery unit 402 side when the AC adapter 404 is removed.

Thereafter, the monitor 110 may be configured such that the monitor 110 is not automatically switched to the battery-off mode but can be switched by a user to the battery-off mode at given timing. This makes it possible to prevent the power of the monitor 110 from being accidentally turned on in a case where, for example, the monitor is carried for the purpose of moving houses, giving the monitor to somebody, or the like.

(Program and Recording Medium)

Each function of the TV 100 as described in the embodiment can be (i) realized by means of hardware by use of logic circuits provided on an integrated circuit (IC chip) or (ii) realized by means of software by use of a CPU (Central Processing Unit).

For example, the TV 1 includes a CPU for executing commands of a program for implementing each function, a ROM (Read Only Memory) in which the program is stored, a RAM (Random Access Memory) on which the program is loaded, and a storage device (recording medium) of any kind, such as a memory, in which the program and various data are stored. Each function of the TV can be realized by causing the CPU to read out and execute the program stored in the recording medium.

For example, a tape such as a magnetic tape or a cassette tape, a disk including (i) a magnetic disk such as a floppy (registered trademark) disk or a hard disk and (ii) an optical disc such as a CD-ROM, an MO, an MD, a DVD, or a CD-R, a card such as an IC card (including a memory card) or an optical card, a semiconductor memory such as a mask ROM, an EPROM, an EEPROM, or a flash ROM, a logic circuit such as a PLD (Programmable Logic Device) or an FPGA (Field Programmable Gate Array), or the like can be used as the recording medium.

The program may be delivered to the TV 100 over a communications network. The communications network can be of any type as long as at least the program can be transmitted to the TV 100. The communications network may be, for example, the Internet, an intranet, extranet, LAN, ISDN, VAN, CATV communications network, virtual dedicated network (virtual private network), telephone line network, mobile communications network, or satellite communications network.

A transfer medium for delivering the program to the TV 100 can be of any type. The transfer medium may be, for example, wired line, such as IEEE 1394, USB, electric power line, cable TV line, telephone line, or ADSL (Asymmetric Digital Subscriber Line) line. Alternatively, the transfer medium may be wireless, such as infrared radiation (IrDA, remote control), Bluetooth (Registered Trademark), IEEE 802.11 wireless, HDR (High Data Rate), NFC (Near Field Communication), DLNA, mobile telephone network, satellite line, or terrestrial digital network.

(Modified Example)

The present invention is not limited to the above-described embodiments but allows various modifications within the scope of the claims. Any embodiment derived from an appropriate combination of the technical means disclosed in the different embodiments will also be included in the technical scope of the present invention.

(Device)

The embodiment describes an example case in which a monitor including no tuner is employed as a device that can be driven by an external power supply or a secondary battery. Note, however, that the device can be any device as long as the device can at least be driven either by an external power supply or by a secondary battery.

For example, the device can be a monitor including a tuner. Examples of the device can also include a notebook PC, personal digital assistant (PDA), a mobile phone, a portable game machine, a portable navigation device, a portable music player, a portable video player, an electronic book reader, and any other device.

(Discharge Device)

In the embodiment, after displaying the discharge recommendation screen, the monitor 110 carries out actual discharging by switching, via a user's manual operation, to battery driving. However, the monitor 110 may also be configured to carry out discharging automatically.

For example, the monitor 110 may be configured to carry out discharging automatically by switching to battery driving automatically. In another example, the monitor 110 may be configured to carry out discharging automatically in a case where a certain device that consumes electric power of a battery is operated while the monitor 110 continues to be driven by the external power supply.

Figure 19:
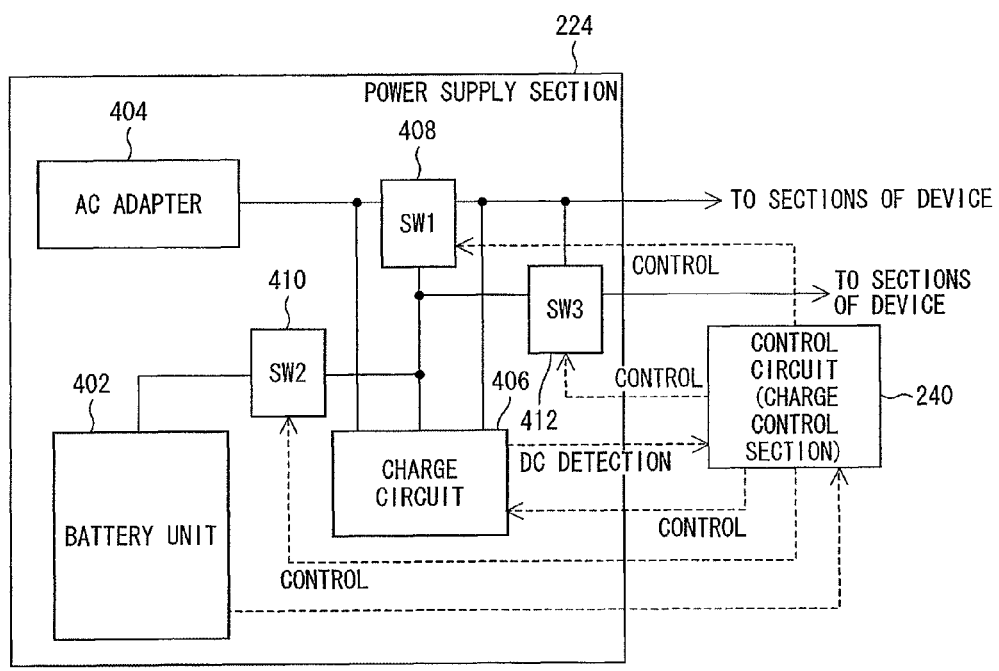
FIG. 19 is a block diagram showing a modified example of a configuration of a power supply section according to an embodiment.

The following describes, with reference to FIG. 19, an example of a configuration in which discharging is carried out automatically. FIG. 19 is a block diagram showing a modified example of a configuration of the power supply section 224 according to the embodiment. The power supply section 224 shown in FIG. 19 is different from the power supply section 224 shown in FIG. 4 in that the power supply section 224 shown in FIG. 19 further includes a switch 412 (SW3) which serves as discharging means for discharging the battery unit 402.

In the power supply section 224 shown in FIG. 4, the switch 408 (SW1) is provided on the supply path (hereinafter referred to as "first supply path") through which electric power is supplied from the AC adapter 404 to the sections of the monitor 110 via the switch 408 (SW1).

On the other hand, the switch 412 (SW3) is provided on a supply path (hereinafter referred to as "second supply path") through which electric power is supplied from the battery unit 402 to the sections of the monitor 110 without passing through the switch 408 (SW1). The switch 412 (SW3) is controlled by the control circuit 240 to be turned on or off, thereby connecting or interrupting the second supply path.

Accordingly, the power supply section 224 shown in FIG. 19 can discharge electric power of the battery unit 402 via the second supply path by switching on the switch 412 (SW3), even in a case where the switch 408 (SW1) has been switched to the AC adapter 404 side. That is, by configuring the power supply section 224 as shown in FIG. 19, the monitor 110 of the present embodiment can discharge the battery unit 402 while the monitor 110 continues to be driven by the external power supply. In this case, electric power outputted from the battery unit 402 may be supplied to a device driven by the external power supply, or may be supplied to another device, which is different from the device driven by the external power supply.

Note that, in a case of adopting the configuration in which discharging is automatically carried out, the monitor 110 can check with a user, before automatically carrying out discharging, whether or not discharging needs to be carried out. This can be carried out by, for example, displaying a screen (hereinafter referred to as "discharge checking screen") for checking with a user whether or not to carry out discharging.

Figure 20:
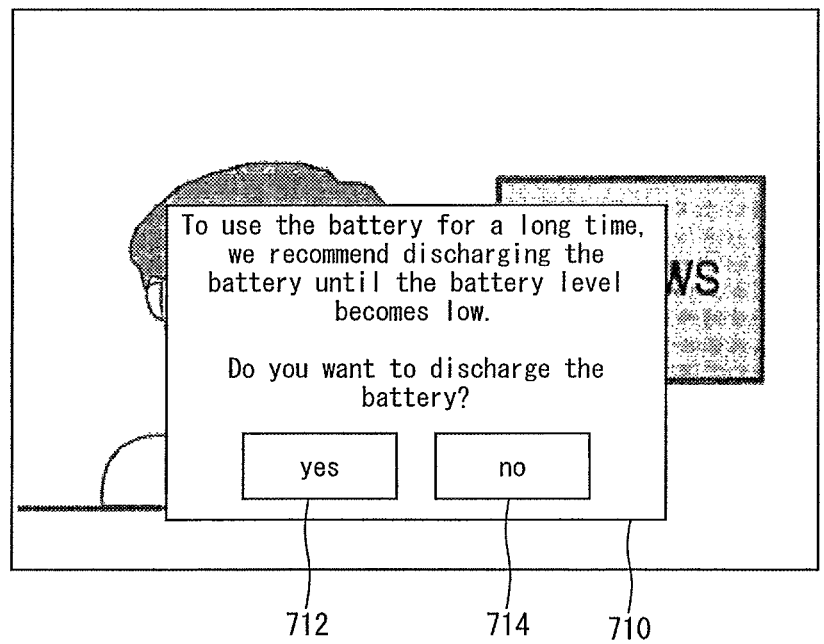
FIG. 20 shows an example of a discharge checking screen displayed by a monitor according to an embodiment.

The following describes, with reference to FIG. 20, an example of what is displayed on the discharge checking screen. FIG. 20 shows an example of the discharge checking screen displayed by the monitor 110 according to the embodiment. The screen 710 shown in FIG. 20 is a discharge checking screen. The screen 710 shows a message that recommends a user to discharge the battery unit 402 and a message that checks with the user whether or not to discharge the battery unit 402. For example, in a case where a state in which the remaining battery level of the battery unit 402 is more than a predetermined level continues for a predetermined time period, the monitor 110 displays the screen 710 on the display 219.

In the example shown in FIG. 20, the screen 710 contains a button 712 and a button 714 to be used by a user to select whether or not to discharge the battery unit 402. In a case where the button 712 is selected, the monitor 110 discharges the battery unit 402 by switching to battery driving. In a case where the button 714 is selected, the monitor 110 continues to be driven by the external power supply without discharging the battery unit 402.

As described above, the monitor 110 of the present embodiment can employ a configuration in which a user selects whether or not to discharge the battery unit 402. This makes it possible to prevent the battery unit 402 from being discharged against a user's will.

(Range for Preliminary Charging)

In the embodiment, a lower limit level and an upper limit level of a range for preliminary charging are 0% and 8%, respectively, but not limited to these. The lower limit level and the upper limit level of the range for preliminary charging can each be set to an appropriate level in accordance with a type and a characteristic of the secondary battery.

For example, the lower limit level can be set to such a level that, in a case where the remaining battery level of the secondary battery falls below the level, a degradation of the secondary battery is accelerated.

In order to minimize the number of preliminary charging operations of the secondary battery, the upper limit level can be set to such a level that a certain length of time (e.g., 3 weeks) is required for the remaining battery level of the secondary battery to be reduced from the upper limit level to the lower limit level by self discharge.

(Timing for Starting Preliminary Charging)

In the embodiment, the preliminary charging of the secondary battery is started when the remaining battery level of the secondary battery is reduced to the lower limit level of a predetermined range (0% to 8%). Note, however, that it also possible to employ a configuration in which, even in a case where the remaining battery level of the secondary battery has not been reduced to the lower limit level, the preliminary charging of the secondary battery is carried out as long as the remaining battery level is in the predetermined range. Also in this case, the remaining battery level of the secondary battery can be maintained within the predetermined range, as with the embodiment.

(Arrangement of Charging Device and Charge Control Apparatus)

The embodiment describes an example case in which a charging device (the charge circuit 406 in the embodiment) for charging the secondary battery, and a charge control apparatus (the charge control section of the control circuit 240 in the embodiment) for controlling the charging of the secondary battery are built in a device (the monitor 110 in the embodiment) itself which is driven by the secondary battery.

Note, however, that at least one of the charging device and the charge control apparatus may be provided outside the device driven by the secondary battery.

(Notifications)

In the embodiment, a message that recommends a user not to carry out discharging or a message that recommends the user to carry out discharging is displayed in order to notify the user that the charging is not recommended or in order to notify the user that the discharge is recommended. Note, however, that other means of notification such as voice output may be used to notify the user that the charging is not recommended or the discharge is recommended.

Figure 21:
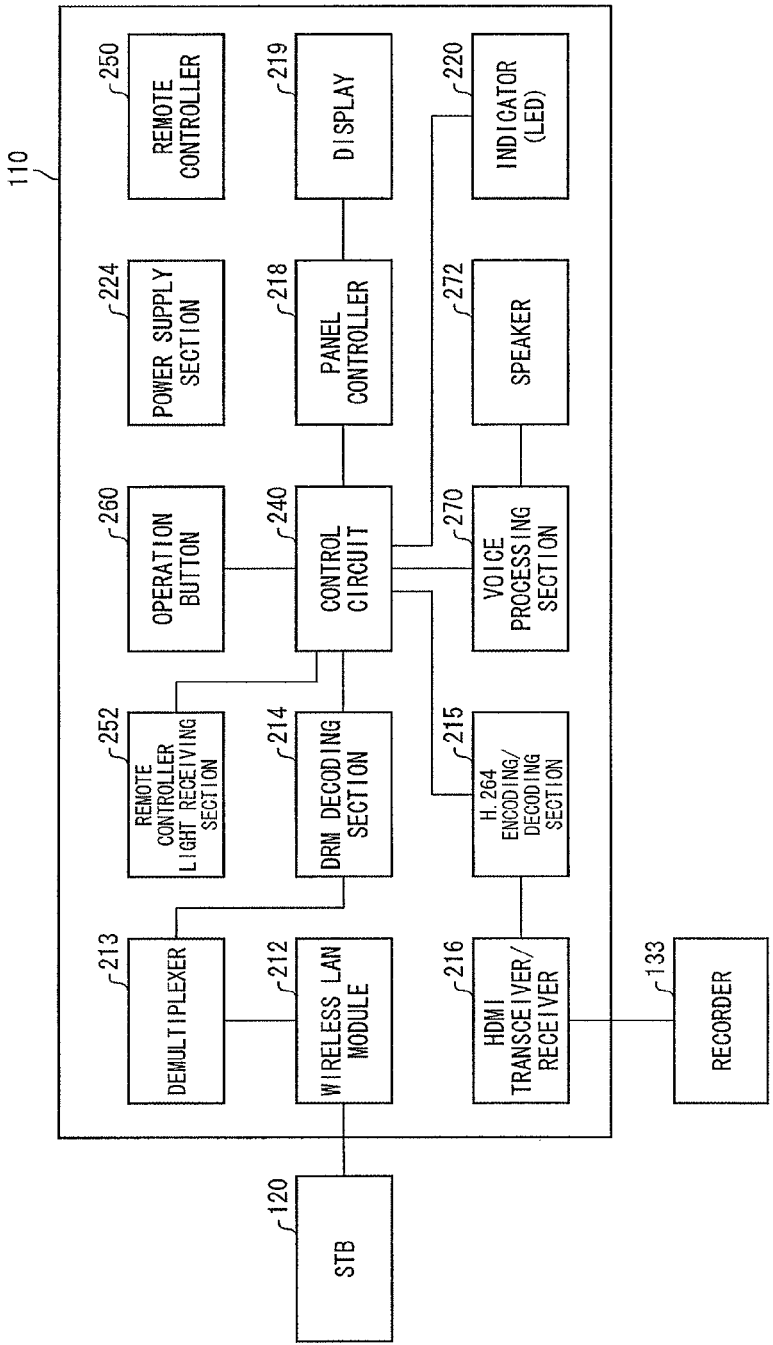
FIG. 21 is a block diagram showing a modified example of a configuration of a monitor according to an embodiment.
Figure 22:
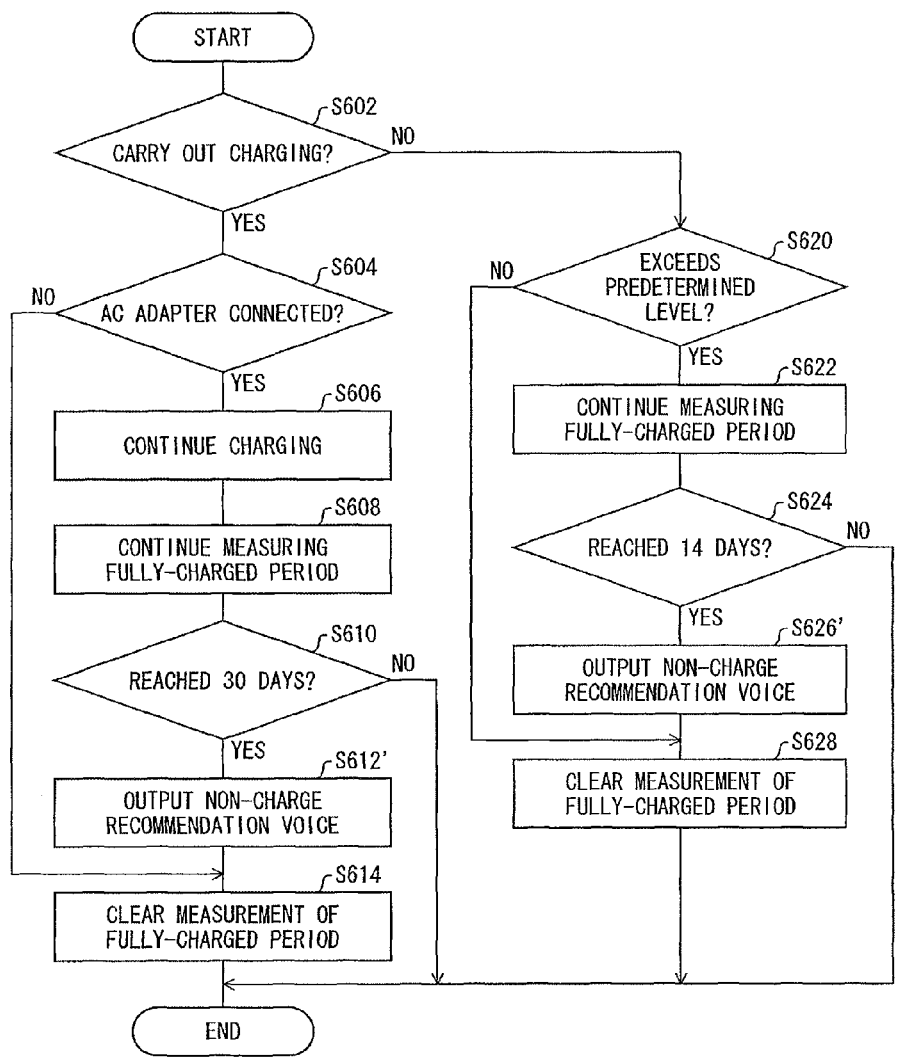
FIG. 22 is a flowchart showing a modified example of successive steps for charging control carried out by a charge control section according to an embodiment.

The following description discusses, with reference to FIGS. 21 and 22, an example in which various notifications are made by voice output. FIG. 21 is a block diagram showing a modified example of a configuration of the monitor 110 according to the embodiment. The monitor 110 shown in FIG. 21 is different from the monitor 110 shown in FIG. 2 in that the monitor 110 shown in FIG. 21 further includes a voice processing section 270 and a speaker 272 for allowing various notifications to be made by voice output.

In the monitor 110 shown in FIG. 21, the charge control section can output, from the speaker 272, a voice (hereinafter referred to as "non-charge recommendation voice") that recommends a user not to charge the battery unit 402, in order to prevent the secondary battery from being in a fully-charged state for a long time period.

In the monitor 110 shown in FIG. 21, the charge control section can also output, from the speaker 272, a voice (hereinafter referred to as "discharge recommendation voice") that recommends a user to discharge the battery unit 402, in order to prevent the secondary battery from being in a fully-charged state for a long time period.

For example, the charge control section supplies the voice processing section 270 with (i) a digital voice signal corresponding to the non-charge recommendation voice and (ii) a digital voice signal corresponding to the discharge recommendation voice. The voice processing section 270 subjects the supplied digital voice signals to various voice processings such as DA conversion, amplification, and noise removal, thereby generating analog voice signals corresponding to the respective digital voice signals. The voice processing section 270 supplies the analog voice signals thus generated to the speaker 272. This causes the speaker 272 to output a non-charge recommendation voice and a discharge recommendation voice.

FIG. 22 is a flowchart showing a modified example of the successive steps for charging control carried out by the charge control section according to the embodiment. FIG. 22 shows successive steps for charging control carried out in the monitor 110 shown in FIG. 21. The successive steps shown in FIG. 22 are different from the successive steps shown in FIG. 6 in that step 612 is replaced with step S612', and step 626 is replaced with step S626'.

That is, according to the monitor 110 shown in FIG. 21, in a case where the charge control section determines at step S610 that the fully-charged period has reached 30 days (step S610: Yes), the charge control section outputs the non-charge recommendation voice from the speaker 272 (step S612'). For example, the charge control section outputs, as the non-charge recommendation voice, a voice that says "The battery has not been used for a long time. In this case, we recommend changing the setting to not charge the battery."

Further, according to the monitor 110 shown in FIG. 21, in a case where the charge control section determines at step S624 that the fully-charged period has reached 14 days (step S624: Yes), the charge control section outputs the discharge recommendation voice from the speaker 272 (step S626'). For example, the charge control section outputs, as the discharge recommendation voice, a voice that says "In order to use the battery for a long time, please use the TV with the power cord unplugged until the remaining battery level becomes low."

As described above, the monitor 110 of the embodiment can also be configured to use voice output in order to give various notifications to a user. This allows the monitor 110 to give various types of information to the user in an auditory way as well, and thus enhance communicability of the various types of information to the user.

In the example shown in FIG. 22, the charge control section outputs the non-charge recommendation voice instead of displaying the non-charge recommendation screen (see FIG. 7). Note, however, that the charge control section may also be configured, for example, to not only output the non-charge recommendation voice but also display the non-charge recommendation screen.

Further, in the example shown in FIG. 22, the charge control section outputs the discharge recommendation voice instead of displaying the discharge recommendation screen (see FIG. 8). Note, however, that the charge control section may also configured, for example, to not only output the discharge recommendation voice but also display the discharge recommendation screen.

Further, the monitor 110 may also be configured to allow a user to appropriately make settings on how to give various notifications, for example, whether to give the various notifications by displaying a screen, by outputting a voice, or by displaying a screen and outputting a voice output. In this case, the monitor 110 may be configured to allow the user to make a setting, for each content of notification, on how to give a notification.

(Conclusion)

As described above, the charge control apparatus according to the present embodiment is a charge control apparatus for controlling charging of a secondary battery that is used in a device capable of being driven both with use of an external power supply and with use of the secondary battery, including: a first mode in which, in a case where electric power is supplied from the external power supply to the device, main charging of the secondary battery with use of the electric power supplied from the external power supply is carried out; and a second mode in which, even in the case where the electric power is supplied from the external power supply to the device, the main charging of the secondary battery with use of the electric power supplied from the external power supply is not carried out.

According to the charge control apparatus, by setting the mode of the charge control apparatus to the second mode, it is possible to prevent the secondary battery from continuing to be charged until the secondary battery reaches a fully-charged state, even in a case where electric power is supplied from the external power supply. This makes it possible to prevent such a situation where, even though the device has not been driven by the secondary battery for a long time period, the secondary battery continues to be charged so as to be in a fully-charged state, which is a cause of degradation, for a long time period. Therefore, the life of the secondary battery can be extended.

Note that the "main charging" denotes a way of charging in which charging of the secondary battery is continued until the secondary battery reaches a fully-charged state (a state in which the remaining battery level is 100% or approximately 100%). That is, the "main charging" denotes a way of charging in which the remaining battery level of the secondary battery is increased as high as possible in order to extend a time in which the device is driven by the secondary battery.

Examples of a way of charging other than the "main charging" include "preliminary charging". The "preliminary charging" denotes a way of charging in which the remaining battery level of the secondary battery is reduced within a predetermined level by stopping charging of the secondary battery before the secondary battery reaches a fully-charged state. The second mode is simply required to be a mode in which at least the main charging is not carried out. The second mode may be a mode in which the secondary battery is not charged at all. Alternatively, the second mode may be a mode in which a way of charging other than the main charging, for example, preliminary charging of the secondary battery is carried out.

It is preferable that the charge control apparatus further include a first notification section for notifying a user of a recommendation to switch to the second mode, in a case where a state continues for a predetermined time period in which state (i) the device is in the first mode and (ii) electric power is supplied from the external power supply to the device.

According to this, in response to the notification, a user switches the setting of the charge control apparatus to the second mode so as to prevent the secondary battery from continuing to be charged. This makes it possible to more reliably prevent continuation of a fully-charged state of the secondary battery for a long time period. This extends a life of the secondary battery.

It is preferable that the charge control apparatus further include a second notification section for notifying a/the user of a recommendation to discharge the secondary battery, in a case where the device is in the second mode.

According to this, in response to the notification, a user, for example, causes the device to discharge the secondary battery. This makes it possible to prevent a situation where, even though charging of the secondary battery is not carried out, the secondary battery continues to be in a fully-charged state for a long time period. This extends the life of the secondary battery.

The charge control apparatus is preferably configured such that the second notification section notifies the user of a recommendation to discharge the secondary battery, in a case where (i) the device is in the second mode for a predetermined time period and (ii) a remaining battery level of the secondary battery exceeds a predetermined upper limit level.

According to the configuration, it is possible to notify a user of a recommendation to discharge the secondary battery in a case where it is more preferable to discharge the secondary batter, such as a case where, even though charging of the secondary battery is not carried out, the remaining battery level of the secondary battery exceeds a predetermined upper limit level for a long time period.

It is preferable that the charge control apparatus further include discharging means for discharging the secondary battery after the second notification section notifies the user of the recommendation to discharge the secondary battery.

According to this, it is possible to discharge the secondary battery without a user's operation. Further, since the secondary battery is discharged after the user is notified, it is possible to prevent the secondary battery from being discharged against a user's will.

The charge control apparatus is preferably configured such that preliminary charging of the secondary battery is carried out in a case where (i) the device is in the second mode and (ii) a remaining battery level of the secondary battery is within a predetermined range.

According to the configuration, it is possible to maintain the remaining battery level of the secondary battery so that the secondary battery does not discharge completely. This makes it possible to prevent such a situation where, in a case where charging of the secondary battery has not been carried out for a long time period, the secondary battery, by self discharge, falls into a fully-discharged state, which is a cause of degradation of the secondary battery. Accordingly, the life of the secondary battery can be extended.

The charge control apparatus is preferably configured such that the preliminary charging is started in a case where the remaining battery level decreases to a lower limit level of the predetermined range.

The secondary battery is degraded more as the number of preliminary charging operations for maintaining the remaining battery level of the secondary battery increases. As such, since the above configuration allows the number of preliminary charging operations to be reduced, it is possible to extend the life of the secondary battery.

The charge control apparatus is preferably configured such that in the first mode, the external power supply and the secondary battery are electrically connected with each other, so that the main charging of the secondary battery is carried out; and in the second mode, the external power supply and the secondary battery are electrically disconnected from each other, so that the main charging of the secondary battery is not carried out.

According to the configuration, by employing a simple and reliable configuration in which, for example, (i) a switch is provided on a supply path through which electric power from the external power supply is supplied to the secondary battery and (ii) the switch is simply controlled to be switched on and off, it is possible to switch between carrying out/not carrying out the main charging of the secondary battery.

A television receiver according to the present embodiment includes the charge control apparatus.

According to the television receiver, the television receiver can provide an effect similar to that provided by the charge control apparatus.

A charge control method according to the present embodiment is a charge control method for controlling charging of a secondary battery that is used in a device capable of being driven both with use of an external power supply and with use of the secondary battery, the method including: a first mode in which, in a case where electric power is supplied from the external power supply to the device, main charging of the secondary battery with use of the electric power supplied from the external power supply is carried out; and a second mode in which, even in the case where the electric power is supplied from the external power supply to the device, the main charging of the secondary battery with use of the electric power supplied from the external power supply is not carried out.

According to the charge control method, the charge control method is carried out by the charge control apparatus, so that an effect similar to that provided by the charge control apparatus can be provided.

INDUSTRIAL APPLICABILITY

The present invention is applicable to a charge control apparatus, a charge control method, a charge control program, and a recording medium battery, each of which is capable of controlling charging of a secondary battery used in a device that can be driven by a battery.

REFERENCE SIGNS LIST

100: TV (television receiver)
110: monitor (a device that can be driven by an external power supply or a secondary battery)
120: STB
224: power supply section
240: control circuit (charge control section, first notification section, and second notification section)
402: battery unit (secondary battery)
404: AC adapter (external power supply)
406: charge circuit
408: switch
410: switch

The invention claimed is:

1. A charge control apparatus for controlling charging of a secondary battery that is used in a device capable of being driven with use of an external power supply or the secondary battery, comprising:
    a first mode in which, responsive to electric power being supplied from the external power supply to the device, main charging of the secondary battery with use of the electric power supplied from the external power supply is carried out;
    a second mode in which, responsive to the electric power being supplied from the external power supply to the device, the main charging of the secondary battery with use of the electric power supplied from the external power supply is not carried out; and
    a first notification section for notifying a user of a recommendation to discharge the secondary battery, responsive to (i) the device being in the second mode for a predetermined time period that is greater than 0 and (ii) a remaining battery level of the second battery exceeding a predetermined upper limit level for the predetermined time period; and
    a second notification section for notifying the user of a recommendation to switch to the second mode, responsive to a state continuing for a predetermined time period in which state (i) the device is in the first mode and (ii) electric power is supplied from the external power supply to the device.

2. A charge control apparatus as set forth in claim 1, further comprising:
    discharging unit for discharging the secondary battery after the first notification section notifies the user of the recommendation to discharge the secondary battery.

3. The charge control apparatus as set forth in claim 1, wherein:
    preliminary charging of the secondary battery is carried out responsive to (i) the device being in the second mode and (ii) a remaining battery level of the secondary battery being within a predetermined range.

4. The charge control apparatus as set forth in claim 3, wherein:
    the preliminary charging is started responsive to the remaining battery level decreasing to a lower limit level of the predetermined range.

5. The charge control apparatus as set forth in claim 1, wherein:
    in the first mode, the external power supply and the secondary battery are electrically connected with each other, so that the main charging of the secondary battery is carried out; and
    in the second mode, the external power supply and the secondary battery are electrically disconnected from each other, so that the main charging of the secondary battery is not carried out.

6. A television receiver comprising a charge control apparatus recited in claim 1.

7. A charge control method for controlling charging of a secondary battery that is used in a device capable of being driven with use of an external power supply or the secondary battery, the method comprising:
    a first mode in which, responsive to electric power being supplied from the external power supply to the device, main charging of the secondary battery with use of the electric power supplied from the external power supply is carried out;
    a second mode in which, responsive to the electric power being supplied from the external power supply to the device, the main charging of the secondary battery with use of the electric power supplied from the external power supply is not carried out; and
    a first notification step for notifying a user of a recommendation to discharge the secondary battery, responsive to the device being in the second mode for a predetermined time period and a remaining battery level of the second battery exceeding a predetermined upper limit level for the predetermined time period; and
    a second notification step for notifying the user of a recommendation to switch to the second mode, responsive to a state continuing for a predetermined time period in which state (i) the device is in the first mode and (ii) electric power is supplied from the external power supply to the device.

* * * * *